US012672707B2

(12) United States Patent
Ma

(10) Patent No.: US 12,672,707 B2
(45) Date of Patent: Jul. 7, 2026

(54) PORTABLE SUITCASES

(71) Applicant: JIANGSU SHUAIMA SECURITY TECHNOLOGY CO., LTD., Wujiang (CN)

(72) Inventor: Zhenyu Ma, Wujiang (CN)

(73) Assignee: JIANGSU SHUAIMA SECURITY TECHNOLOGY CO., LTD., Wujiang (CN)

( * ) Notice: Subject to any disclaimer, the term of this patent is extended or adjusted under 35 U.S.C. 154(b) by 20 days.

(21) Appl. No.: 18/830,621

(22) Filed: Sep. 11, 2024

(65) Prior Publication Data

US 2025/0331618 A1 Oct. 30, 2025

(30) Foreign Application Priority Data

Apr. 24, 2024 (CN) ........................ 202420864562.X

(51) Int. Cl.

| | |
|---|---|
| ***A45C 15/00*** | (2006.01) |
| ***A45C 1/00*** | (2006.01) |
| ***A45C 5/03*** | (2006.01) |
| ***A45C 13/00*** | (2006.01) |
| ***A45C 13/02*** | (2006.01) |
| ***A45C 13/26*** | (2006.01) |
| *G07G 1/00* | (2006.01) |

(52) U.S. Cl.

CPC ................ *A45C 15/00* (2013.01); *A45C 1/00* (2013.01); *A45C 5/03* (2013.01); *A45C 13/005* (2013.01); *A45C 13/02* (2013.01); *A45C 13/26* (2013.01); *A45C 2001/006* (2013.01); *A45C 2005/037* (2013.01); *G07G 1/0027* (2013.01)

(58) Field of Classification Search

CPC .. A45C 15/00; A45C 1/00; A45C 1/10; A45C 5/03; A45C 13/005; A45C 13/02; A45C 13/26; A45C 11/16; A45C 2001/006; A45C 2005/037; G07G 1/0027; A01K 97/06; B25H 3/023

USPC ............................................. 43/54.1; D99/34

See application file for complete search history.

(56) References Cited

U.S. PATENT DOCUMENTS 1,800,186 A * 4/1931 Shriver .................. B25H 3/023
312/271

2,508,283 A * 5/1950 Nelson ..................... A45C 1/00
206/0.81

(Continued)

FOREIGN PATENT DOCUMENTS

CN 202774614 U * 3/2013
CN 208636958 U 3/2019

(Continued)

*Primary Examiner* — William L Miller

(74) *Attorney, Agent, or Firm* — PORUS IP LLC

(57) ABSTRACT

Disclosed is a portable suitcase, comprising a case, a case lid, a box, and a cover plate. Side walls of the case and a bottom surface of the case enclose a first accommodation space, tops of the side walls enclose a first opening, and the first opening is connected to the first accommodation space. One of sides of the case lid is rotatably connected to the top of one of the side walls of the case. A top of the box forms a second opening, the box is rotatably connected to an inner side wall of the case. The cover plate includes opposing a first side and a second side, the first side is rotatably connected to the case lid, and both ends of the second side are slidably connected to tops of two opposing interior side walls of the box.

18 Claims, 11 Drawing Sheets

(56) References Cited

U.S. PATENT DOCUMENTS

| | | | | | |
|---|---|---|---|---|---|
| 2,522,768 | A * | 9/1950 | Wiepert | A45C 1/10 | 206/0.81 |
| 2,564,122 | A * | 8/1951 | Mele | A45C 11/16 | 312/204 |
| 2,711,357 | A * | 6/1955 | Nelson | A45C 1/10 | 242/559.2 |
| 2,755,154 | A * | 7/1956 | Mele | A45C 11/16 | 312/274 |
| 2,950,003 | A * | 8/1960 | Simmons | A45C 11/16 | 206/565 |
| 3,000,685 | A * | 9/1961 | Gross | A45C 11/16 | 312/902 |
| 3,285,681 | A * | 11/1966 | Niederer | A45C 1/10 | 312/204 |
| 3,926,308 | A * | 12/1975 | Sullivan | B25H 3/023 | 206/723 |
| 4,363,229 | A | 12/1982 | Baitz | | |
| 4,611,711 | A * | 9/1986 | Warwicker | E05G 1/005 | 206/0.81 |
| 4,890,414 | A * | 1/1990 | Bridenthal | A01K 97/06 | 224/406 |
| 5,168,987 | A * | 12/1992 | Warwicker | A45C 1/00 | 206/0.81 |
| 5,358,100 | A * | 10/1994 | Wolff | A45C 5/005 | 206/823 |
| 5,475,943 | A * | 12/1995 | Hodges | A01K 97/06 | 43/57.1 |
| 6,003,690 | A * | 12/1999 | Allen | G07G 1/0027 | 211/51 |
| 6,045,202 | A * | 4/2000 | Simon | A45C 11/16 | 312/273 |
| 10,403,099 | B1 * | 9/2019 | Mueller | G07G 1/0027 | |
| D978,477 | S * | 2/2023 | Arjonilla | D99/34 | |
| D1,040,468 | S * | 8/2024 | Gu | D99/34 | |
| D1,040,469 | S * | 8/2024 | Gu | D99/34 | |
| D1,043,026 | S * | 9/2024 | Gu | D99/34 | |
| D1,047,344 | S * | 10/2024 | Arjonilla | D99/34 | |
| 2007/0033858 | A1 * | 2/2007 | Marino | A01K 97/06 | 43/54.1 |
| 2010/0180804 | A1 * | 7/2010 | Czarnecki | A45C 13/18 | 109/53 |
| 2012/0068588 | A1 * | 3/2012 | Specht | G07G 1/0027 | 312/293.1 |
| 2015/0206401 | A1 * | 7/2015 | Yonemaru | G07G 1/0027 | 312/348.3 |
| 2019/0168908 | A1 | 6/2019 | Lee et al. | | |
| 2022/0297898 | A1 | 9/2022 | Hu et al. | | |

FOREIGN PATENT DOCUMENTS

| | | | | |
|---|---|---|---|---|
| CN | 210520309 U | 5/2020 | | |
| CN | 215286020 U | 12/2021 | | |
| CN | 217982453 U | 12/2022 | | |
| CN | 221378671 U * | 7/2024 | | |
| EP | 0368693 A1 | 5/1990 | | |
| JP | 2004225440 A * | 8/2004 | | |
| KR | 102134038 B1 | 7/2020 | | |
| WO | WO-2010019529 A1 * | 2/2010 | | A45C 1/10 |

* cited by examiner

PORTABLE SUITCASES

CROSS-REFERENCE TO RELATED APPLICATIONS

This application claims priority to Chinese patent application 202420864562.X, filed on Apr. 24, 2024, the entire contents of which are incorporated herein by reference.

TECHNICAL FIELD

The present disclosure generally relates to the technical field of cash register equipment, and in particular, to a portable suitcase.

BACKGROUND

Portable suitcases are essential tools for financial cashiers when they work. The interior of the suitcase is separated into two parts, one of which is a bill compartment used for placing coins or small-denomination bills, and the other of which is a bill compartment used for placing large-denomination bills.

An existing portable suitcase may include a case, a case lid, and a stowage inner case. The case lid is flipped and covered on the case by a pair of hinges, the stowage inner case is disposed in the case, and a plurality of dividing boards are arranged at intervals in the stowage inner case. The plurality of dividing boards divide the stowage inner case into a number of bill stowage compartments and coin stowage compartments, each bill stowage compartment is correspondingly equipped with a compression assembly, and a carrying handle is provided on an outer wall of the case lid.

Although the existing portable suitcase is capable of storing bills and coins, and the bill stowage compartment is correspondingly equipped with the compression assembly, coins are prone to slip out of the coin stowage compartment when the suitcase is handled or moved, and thus there is a lot of inconvenience in use.

Therefore, there is a need to provide an improved portable suitcase to improve efficiency and quality.

SUMMARY

One or more embodiments of the present disclosure provide a portable suitcase. The portable suitcase may comprise a case, a case lid, a box, and a cover plate. Side walls of the case and a bottom surface of the case may enclose a first accommodation space, tops of the side walls may enclose a first opening, and the first opening may be connected to the first accommodation space. One of sides of the case lid may be rotatably connected to the top of one of the side walls of the case such that the case lid is capable of closing the first opening in an opening/closing type. A top of box may form a second opening, the box may be rotatably connected to an inner side wall of the case. The cover plate may include a first side and a second side, the first side may be opposite to the second side, the first side may be rotatably connected to the case lid, and both ends of the second side may be slidably connected to tops of two opposing interior side walls of the box, such that the cover plate is capable of closing the second opening in the opening/closing type. During a process of closing the first opening, the cover plate may be moved to the top of the box to seal the second opening, and the box may be moved through the first opening into the first accommodation space. During a process of opening the first opening, the bottom may be moved through the first opening to the outside of the first accommodation space, and the cover plate may be moved to open the second opening.

In some embodiments, the portable suitcase may further comprise two linear slide grooves disposed oppositely and two sliders. Two linear slide grooves may be respectively recessed at the tops of two opposite side walls of the box. Two sliders may protrude from both ends of the second side of the cover plate, and the two sliders may be respectively snapped into the two linear slide grooves. During a process of opening or closing the second opening, the first side of the cover plate may be rotated relative to the case lid, and the second side of the cover plate may slide along an extension direction of the linear slide grooves.

In some embodiments, the portable suitcase may further comprise at least one limiting block and at least one limiting slot or limiting hole. When the second opening is opened, at least one limiting block may protrude from the top of a side wall of a side of the cover plate proximate to the box. When the second opening is opened, at least one limiting slot or limiting hole may be disposed at the top of a side wall of a side of the box away from the cover plate. When the second opening is closed, the limiting block may be snapped correspondingly into the limiting slot or the limiting hole.

In some embodiments, when the second opening is opened, the box may be located above the box; a connection between the first side of the cover plate and the case lid may be located above a connection between the cover plate and the case, and the second side of the cover plate may slide to the side of the box proximate to the cover plate; and a lower surface of the cover plate may form an angle with an upper surface of the box.

In some embodiments, the box may include a box bottom plate, box side walls, and at least one first partition. The box side walls may be vertically connected to an edge of the box bottom plate, the box side walls and the box bottom plate may surround to form a second accommodation space. The at least one first partition may be connected to the box bottom plate and/or the box side walls, such that the second accommodation space is separated into at least two sub-spaces.

In some embodiments, the portable suitcase may further comprise at least two linkage arms. One end of each of the linkage arms may be rotatably connected to the box, and the other end of each of the linkage arms may be rotatably connected to the case. When the first opening is opened, the linkage arms located on the same side of the box may be parallel to each other.

In some embodiments, the cover plate may include a flat plate, a stiffener, and a limiting plate. The stiffener may be disposed on at least one surface of the flat plate. The limiting plate may be vertically connected to a lower surface of the flat plate, the limiting plate may be disposed at the edge of a side of the flat plate close to the case. When the second opening is closed, the limiting plate may be abutted against an outer wall of the box.

In some embodiments, a lower surface of the second side may be provided with at least one block, the block may be inverted U-shaped, the block may be correspondingly connected to the first partition, such that the block is snapped to a top of the first partition.

In some embodiments, the portable suitcase may further comprise a second partition. The second partition may be disposed vertically within the first accommodation space along a height direction of the case and connected to an inner wall of the case. The box may include a first partition, and a center surface of the second partition may be perpendicular to a center surface of the first partition, such that the first accommodation space is separated into an avoidance space and a storage space.

In some embodiments, the box may be rotatably connected to a connection between the avoidance space and the storage space, when the first opening is opened, the box may be located above the avoidance space, and when the first opening is closed, the box may be located inside the storage space.

In some embodiments, the portable suitcase may further comprise at least one third partition and at least one set of compression assemblies. The at least one third partition may be disposed in parallel in the storage space and connected to a bottom wall of the case, such that the storage space is separated into at least two bill compartments. The at least one set of compression assemblies may be rotatably connected to the second partition, and the compression assemblies may be disposed within the bill compartments for compressing bills.

In some embodiments, the compression assembly may include a pressing arm and a reset member. A head end of the pressing arm may be rotatably connected to the second partition, and a tail end of the pressing arm may be pressed against the bottom wall of the case. The reset member may be disposed between the pressing arm and the second partition, one end of which may be connected to the pressing arm, and the other end of which may be connected to the second partition.

In some embodiments, the pressing arm may be plate-shaped, and the tail end of the pressing arm may include a pressing portion, such that the pressing portion is capable of fitting the bottom wall of the case; or the pressing arm may be tubular, and the tail end of the press arming may be bent along a direction away from the case to form a lifting portion.

In some embodiments, a side wall of the box may be hinged to the inner side wall of the case by at least one linkage arm, the second partition may be provided with an avoidance groove, so that when the at least one linkage arm pulls the box into the storage space, at least one the linkage arm is capable of passing through the avoidance groove to extend into the storage space.

In some embodiments, the side wall of the box may be provided with at least one groove, at least a portion of the at least one linkage arm may be rotatably disposed in the at least one groove, the at least one groove may include a first groove and a second groove, the first groove may be provided along a height direction of the box, the second groove may be connected to a bottom end of the first groove, and provided obliquely toward a direction of the avoidance space.

In some embodiments, a bottom end of the at least one linkage arm may form a bent portion toward an interior of the case.

In some embodiments, a front side wall of the box may have an arc-shaped cross-section along an axial direction, and a concave surface of the arc-shaped cross-section may be oriented toward an interior of the box.

In some embodiments, the case lid may be recessed toward the case to form a mounting groove, and the case lid may be provided with a handle and disposed within the mounting groove.

One or more embodiments of the present disclosure provide a portable suitcase. During the process of opening the suitcase, the case lid may be rotated at an angle relative to the case, and since a first side of the cover plate is rotatably connected to the case lid, a pulling force may be applied to the cover plate when the case lid is rotated, causing the cover plate to slide relative to the box under the pulling force, thereby gradually opening the second opening. At the same time, the case lid may apply a pulling force on the box, and since the box is rotatably connected to the case, the box may be gradually pushed out to the interior of the first accommodation space under the pulling force, so as to facilitate the user to pick up and put down the bills and coins.

During the process of closing the suitcase, the case lid may be rotated at an angle in reverse relative to the case, and since a first side of the cover plate is rotatably connected to the case lid, a thrust force may be applied to the cover plate when the case lid is rotated, causing the cover plate to slide relative to the box under the thrust force, thereby gradually closing the second opening. At the same time, the case lid may apply a thrust force to the box, and since the box is rotatably connected to the case, the box may be gradually pushed into the interior of the first accommodation space under the thrust force, causing that the coin compartments are opened, so as to facilitate the user to carry and take the suitcase.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein.

DETAILED DESCRIPTION

Figure 1:
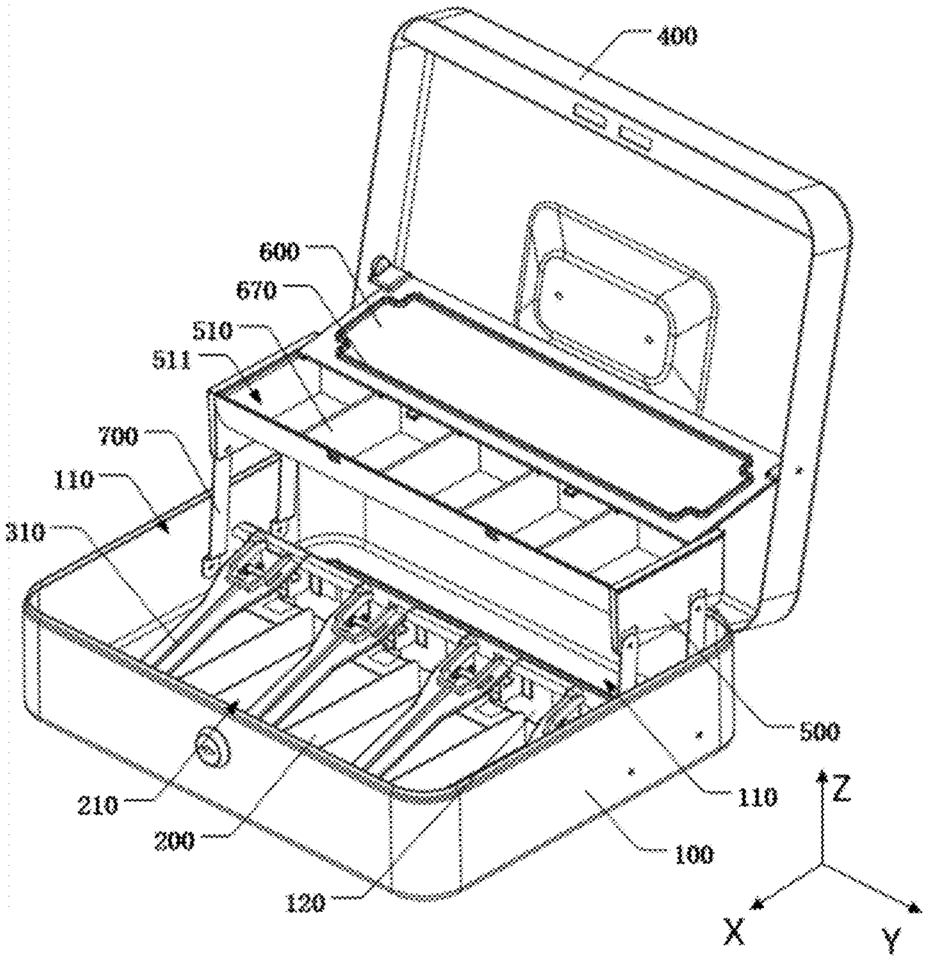
FIG. 1 is a schematic diagram illustrating a portable suitcase in an open state according to some embodiments of the present disclosure.

In order to more clearly illustrate the technical solutions of the embodiments of the present disclosure, the accompanying drawings required to be used in the description of the embodiments will be briefly described below. Obviously, the accompanying drawings in the following description are only some examples or embodiments of the present disclosure, and it is possible for a person of ordinary skill in the art to apply the present disclosure to other similar scenarios based on these drawings without creative labor. The present disclosure may be applied to other similar scenarios based on these drawings without creative labor. Unless obviously obtained from the context or the context illustrates otherwise, the same numeral in the drawings refers to the same structure or operation.

The present disclosure provides a portable suitcase, which is described in detail below. It should be noted that the order in which the following embodiments are described does not serve as a limitation on the preferred order of embodiments of the present disclosure. In the following embodiments, the descriptions of each embodiment have their own focus, and the parts that are not elaborated in a certain embodiment may be found in the relevant descriptions of other embodiments.

FIG. 1 is a schematic diagram illustrating a portable suitcase in an open state according to some embodiments of the present disclosure.

As shown in FIG. 1, some embodiments of the present disclosure provide a portable suitcase, in which the objects in different compartments do not mix in scenarios such as out-of-home use and transportation, and the coins and bills placed in the suitcase do not slip or mix.

The portable suitcase is a structure including a case 100 that may be opened and closed. In some embodiments, the side that may be opened and closed is defined as the front side.

In some embodiments, the suitcase may include a case 100, a case lid 400, a box 500, and a cover plate 600. The case 100 may be rotatably connected to the case lid 400. The case 100 may include an open structure. The box 500 may be rotatably connected to the cover plate 600, and the box 500 may be provided in the case 100.

In some embodiments, side walls and the bottom surface of the case 100 may enclose a first accommodation space 110, and the tops of the side walls of the case 100 may enclose a first opening, which may be connected to the first accommodation space 110.

In some embodiments, one of the sides of the case lid 400 may be rotatably connected to the top of one of the side walls of the case 100 in a variety of ways (e.g., hinge manner), such that the case lid 400 is capable of closing the first opening in an opening/closing type, i.e., the case lid 400 may be placed on top of the case 100. Exemplarily, hinge manner may include at least one of hinges, pins, etc. In some embodiments, the other side of the case lid 400 may be fixed relative to the case 100 by a lock body, and the lock body may be a lock selected from the prior art, which is not repeated here.

Figure 2:
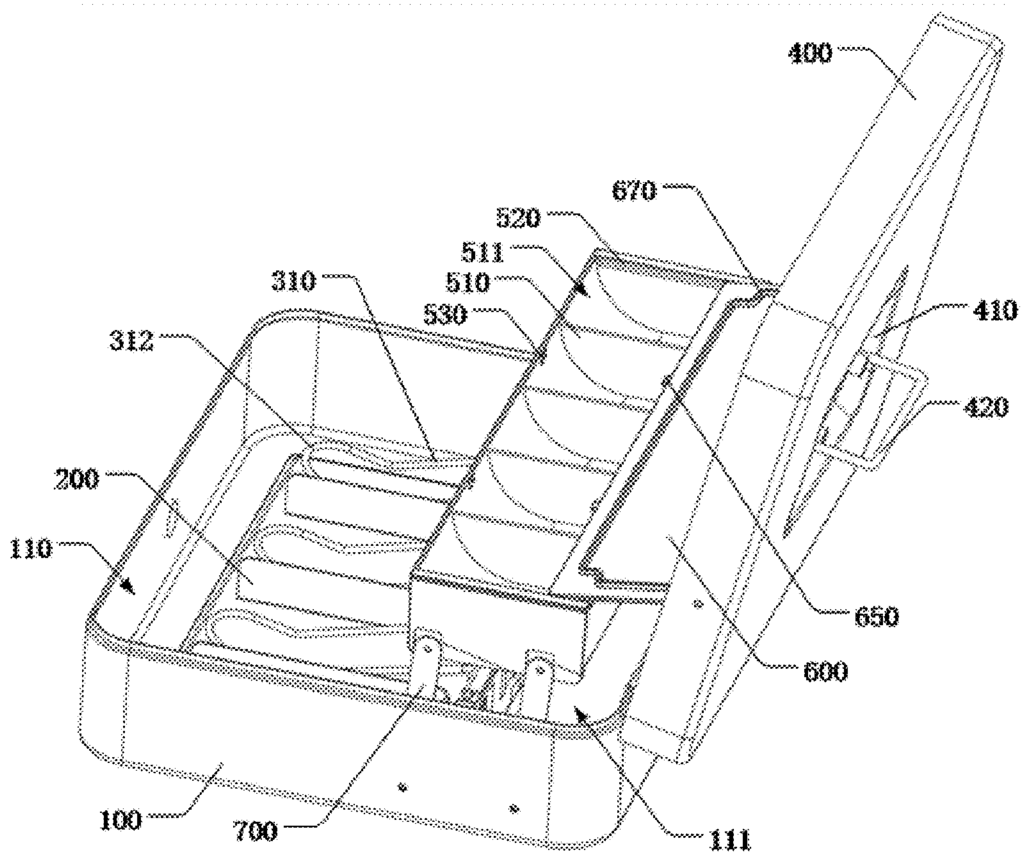
FIG. 2 is another schematic diagram illustrating a portable suitcase in an open state according to some embodiments of the present disclosure.

FIG. 2 is another schematic diagram illustrating a portable suitcase in an open state according to some embodiments of the present disclosure.

In some embodiments, as shown in FIG. 1 and FIG. 2, the portable suitcase may also comprise a second partition 120. The second partition 120 may be provided within the case 100.

The second partition 120 may be used to separate the space within the case 100. In some embodiments, the second partition 120 may be disposed vertically within the first accommodation space 110 along a height direction of the case 100 (e.g., Z direction in FIG. 1) and connected to the inner wall of the case 100. In some embodiments, the second partition 120 may be connected to the inner wall of the case 100 in a variety of ways, for example, at least one of snap-fit connection, integral molding, connection by fastening screws, etc.

In some embodiments, the box 500 may include a first partition 510, and the first partition 510 may be used to separate the space within the box 500.

In some embodiments, the central surface of the second partition 120 may be perpendicular to the central surface of the first partition 510, so that the first accommodation space 110 is separated into an avoidance space 111 and a storage space. More description about the first partition 510 may be found elsewhere in the present disclosure.

In some embodiments, an area on the front side of the case 100 (e.g., an area forward along the X direction in FIG. 1) may be defined as a storage space, and an area on the back side of the case 100 (e.g., an area backward along the X direction in FIG. 1) may be defined as an avoidance space 111. In some embodiments, the second partition 120 may be provided along a left-right direction (e.g., the Y direction in FIG. 1).

The avoidance space 111 may provide space for the movement of other structures.

The storage space may be used to store objects, for example, bills, coins, etc.

More description about the avoidance space 111 and the storage space may be found elsewhere in the present disclosure.

In some embodiments, the second partition 120 may include various shapes, for example, at least one of a straight plate, an L-shaped plate, etc. In some embodiments, when the second partition 120 is an L-shaped plate, the second partition 120 may include a horizontal section and a vertical section. The horizontal section of the second partition 120 may be connected to the bottom wall of the case 100 in a variety of ways, for example, at least one of bonding, snap-fit connection, threaded connection, etc. The vertical section of the second partition 120 may be used to separate the first accommodation space 110.

In some embodiments, the box 500 may be rotatably connected to the connection between the avoidance space 111 and the storage space. When the first opening is opened, the box 500 may be located above the avoidance space 111, and when the first opening is closed, the box 500 may be located inside the storage space.

In some embodiments, at least one third partition 200 may be provided within the case 100, as shown in FIG. 1 and FIG. 2.

The at least one third partition 200 may be used to separate the storage space into multiple areas. In some embodiments, the multiple third partitions 200 may be disposed in parallel within the storage space. In some embodiments, the third partitions 200 may be attached to a bottom wall of the case 100, thus separating the storage space into more than two bill compartments 210. The bill compartments 210 may be used to store bills, etc. In some embodiments, the third partition 200 may be connected to the bottom wall of the case 100 in various ways, for example, at least one of bonding, snap-fit connection, threaded connection, etc.

In some embodiments, the third partition 200 may include various shapes, for example, at least one of a straight plate, an L-shaped plate, etc. In some embodiments, when the third partition 200 is an L-shaped plate, the third partition 200 may include a horizontal portion and a vertical portion. The horizontal portion of the third partition 200 may be connected to the bottom wall of the case 100, and the vertical portion of the third partition 200 may separate the storage space into more than two bill compartments 210. In some embodiments, the at least one third partition 200 may be arranged along a front-to-back direction (i.e., the third partition 200 may be parallel to the X direction in FIG. 1). In some embodiments, the two end portions of the third partition 200 may be proximate to the second partition 120 and the front side wall of the case 100, respectively. In some embodiments, two adjacent third partitions 200, or one third partition 200 and a side wall of the case 100 may form a bill compartment 210.

In some embodiments, the portable suitcase may include at least one set of compression assemblies, as shown in FIG. 1 and FIG. 2. In some embodiments, the at least one set of compression assemblies may be provided within the case 100.

The compression assembly is able to generate pressure to compress other structures or objects, for example, bills, etc. In some embodiments, the compression assembly may be rotatably connected to the second partition 120. In some embodiments, each set of compression assemblies may be rotatably disposed within the bill compartments 210, so as to utilize the compression assemblies to compress the bills placed within the bill compartments 210, and prevent the bills from falling out of the bill compartments 210 during transportation or carrying. In some embodiments, the compression assembly may be provided in correspondence with the bill compartments 210.

Figure 3:
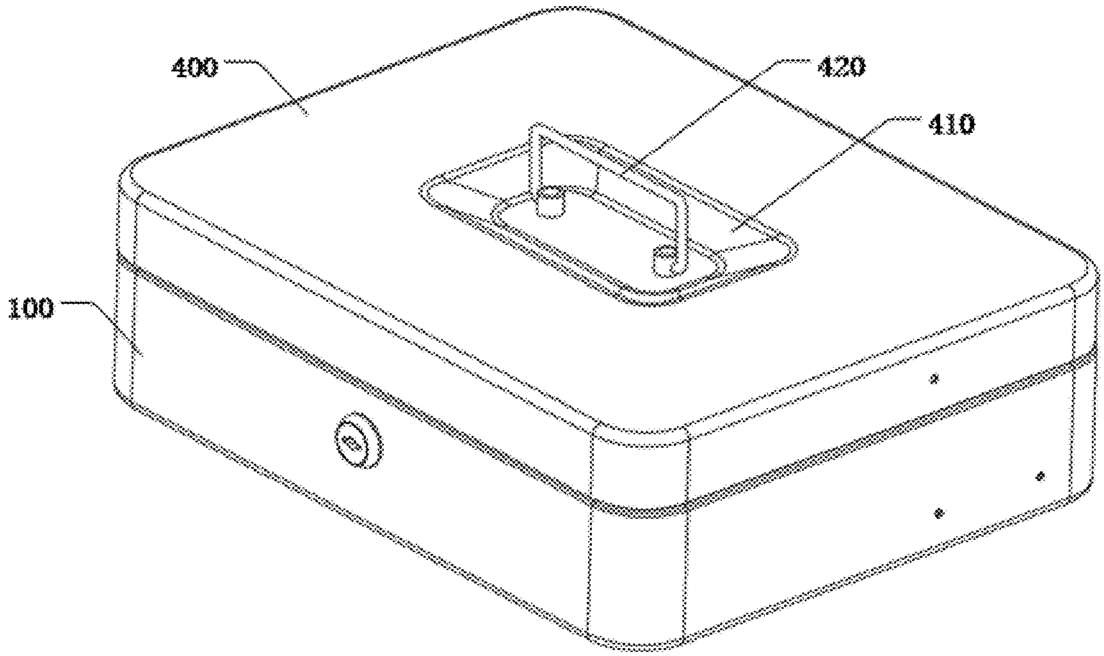
FIG. 3 is a schematic diagram illustrating a portable suitcase in a closed state according to some embodiments of the present disclosure.
Figure 4:
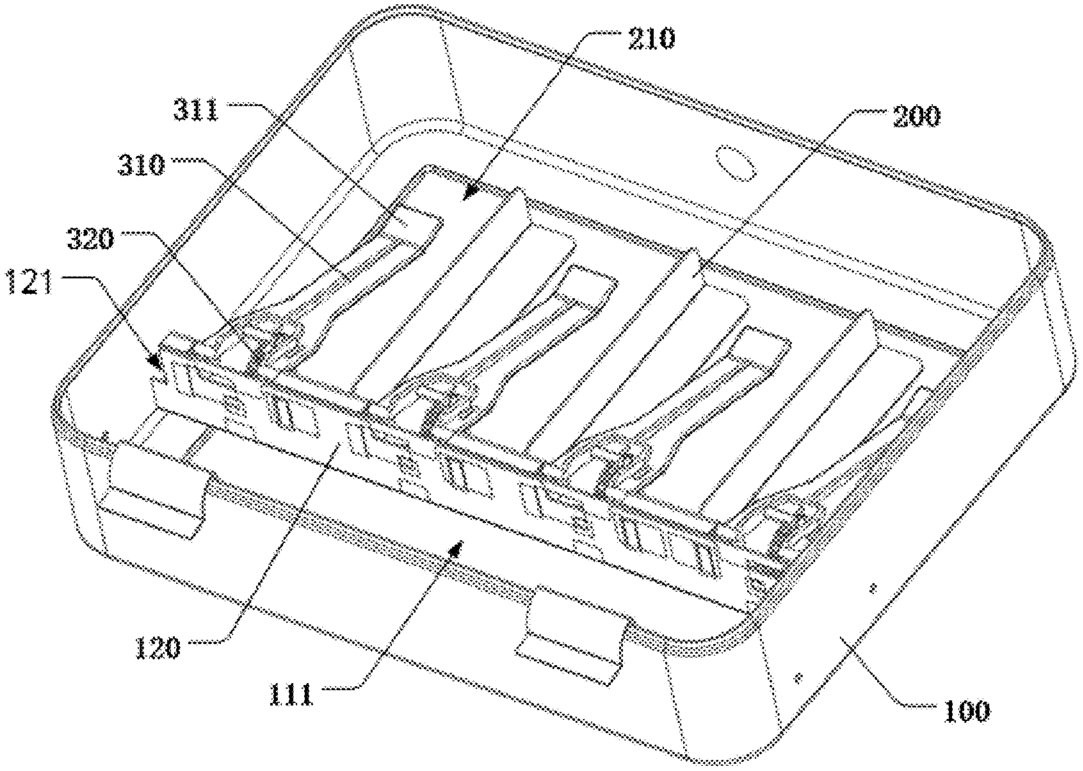
FIG. 4 is a schematic diagram illustrating a structure of a case in a portable suitcase according to some embodiments of the present disclosure.
Figure 5:
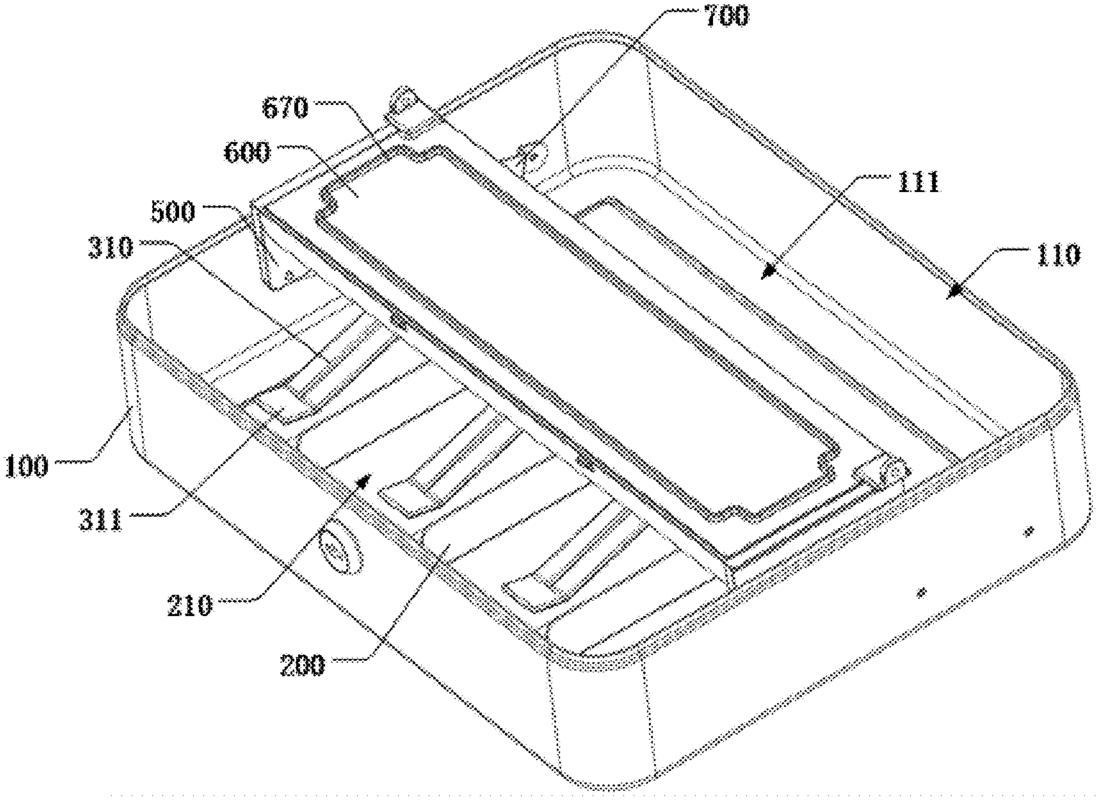
FIG. 5 is a schematic diagram illustrating a case and a box of a portable suitcase in a closed state according to some embodiments of the present disclosure.

FIG. 3 is a schematic diagram illustrating a portable suitcase in a closed state according to some embodiments of the present disclosure. FIG. 4 is a schematic diagram illustrating the structure of a case in a portable suitcase according to some embodiments of the present disclosure. FIG. 5 is a schematic diagram illustrating a case and a box of a portable suitcase in a closed state according to some embodiments of the present disclosure.

In some embodiments, the compression assembly may include a pressing arm 310 and a reset member 320, as shown in FIGS. 1-5.

One end of the pressing arm 310 may apply pressure downwardly along a vertical direction (e.g., the Z direction in FIG. 1). In some embodiments, the head end of the pressing arm 310 may be rotatably connected to the second partition 120 in a variety of ways (e.g., at least one of pins, hinges, etc.), such that the pressing arm 310 is capable of rotating relative to the case 100. In some embodiments, the tail end of the pressing arm 310 may be pressed against the bottom wall of the case 100, such that the tail end of the pressing arm 310 may be pressed above the bills to prevent the bills from falling out of the bill compartments 210. The head end of the pressing arm 310 may be the end of the pressing arm 310 that is connected to the second partition 120. The tail end of the pressing arm 310 may be the end of the pressing arm 310 that is not connected to the second partition 120.

The reset member 320 may be used to provide a force (e.g., tension or pressure, etc.) to the pressing arm 310 such that the pressing arm 310 has a tendency to move downwardly along a vertical direction (e.g., the Z direction in FIG. 1).

In some embodiments, as shown in FIGS. 1-5, the reset member 320 may be disposed between the pressing arm 310 and the second partition 120, an end of the reset member 320 may be connected to the pressing arm 310, and the other end of the reset member 320 may be connected to the second partition 120. In some embodiments, the reset member 320 may include a variety of structures, for example, at least one of a spring, a spring plate, a cylinder, a hydraulic cylinder, etc.

In some embodiments, when the pressing arm 310 is in an initial state, the tail end of the pressing arm 310 may be pressed against the bottom wall of the case 100, and the reset member 320 may be in a natural state or a stretched state. When a user needs to pick up and place bills in the bill compartments 210, the user may lift the pressing arm 310, causing the pressing arm 310 to flip upward, at this time, the reset member 320 may be in a stretched state or a further stretched state. When the user's finger disengages from the pressing arm 310 after the user finishes picking up and placing the bills, the reset member 320 may convert its own elastic force into a force that drives the pressing arm 310 to rotate downwardly, thereby assisting in resetting the pressing arm 310 using the reset member 320.

Figure 6:
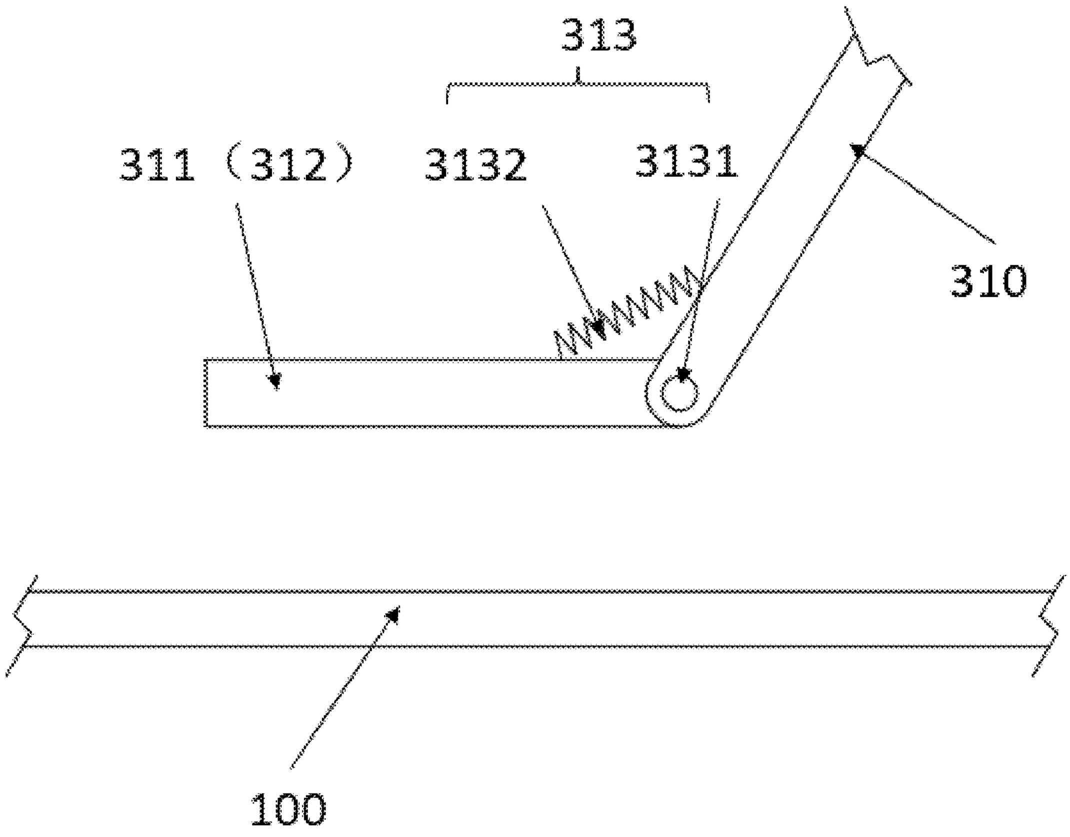
FIG. 6 is a schematic diagram illustrating a structure of a pressing arm according to some embodiments of the present disclosure.

In some embodiments, the pressing arm 310 may include a variety of structures, for example, at least one of a plate structure, a tube structure, etc. In some embodiments, as shown in FIG. 6, when the pressing arm 310 is of a plate shaped structure, the tail end of the pressing arm 310 may include a pressing portion 311. At least one surface of the pressing portion 311 may be plane, and the plane may be parallel to a lengthwise direction of the case 100 (e.g., the Y direction in FIG. 1). When the tail end of the pressing arm 310 is pressed against the bottom wall of the case 100, the pressing portion 311 may fit the bottom wall of the case 100. By adopting a planar pressing portion, the contact area between the pressing arm 310 and the bottom wall of the case 100 or the bills may be increased, thereby increasing the friction between the pressing arm 310 and the bills, and improving the stability of the pressing arm 310 in pressing the bills.

In some embodiments, as shown in FIG. 2, when the pressing arm 310 adopts a tubular structure, the tail end of the pressing arm 310 may be bent along the direction away from the case 100 to form a lifting portion 312, which enables the user to lift the pressing arm 310 using the lifting portion 312, so as to facilitate user operation.

FIG. 6 is a schematic diagram illustrating a structure of a pressing arm according to some embodiments of the present disclosure.

In some embodiments, the pressing portion 311 or the lifting portion 312 may be connected to the pressing arm 310 by a limiting assembly 313, as shown in FIG. 6.

The limiting assembly 313 may vary and/or limit a relative position between the pressing portion 311 and the pressing arm 310 or a relative position between the lifting portion 312 and the pressing arm 310, for example, angles, etc., which can cause the pressing portion 311 or the lifting portion 312 to adapt to different thicknesses of bills.

In some embodiments, the limiting assembly 313 may include a limiting screw 3131, and the pressing portion 311 or the lifting portion 312 may be rotatably connected to the pressing arm 310, respectively, via the limiting screw 3131, so as to adjust the angle between the pressing portion 311 and the pressing arm 310 or the angle between the lifting portion 312 and the pressing arm 310. When the thickness of the bills changes, by adjusting the angle between the pressing portion 311 and the pressing arm 310 or the angle between the lifting portion 312 and the pressing arm 310, the pressing portion 311 or the lifting portion 312 may always be parallel to the bottom wall of the case 100, so as to maintain the maximum contact area between the pressing portion 311 or the lifting portion 312 and the bills, thereby improving the reliability of bill clamping.

In some embodiments, the pressing portion 311 or the lifting portion 312 may be rotatably connected to the pressing arm 310 utilizing the limiting screw 3131, respectively, in multiple ways, for example, a threaded portion of the limiting screw 3131 may pass through the pressing arm 310 and be threadedly connected to the pressing portion 311 or the lifting portion 312. By screwing the limiting screw 3131 in or out, the degree of looseness or tightness between the pressing portion 311 and the pressing arm 310 or between the lifting portion 312 and the pressing arm 310 may be varied so as to adjust the angle between the pressing portion 311 and the pressing arm 310 or between the lifting portion 312 and the pressing arm 310.

In some embodiments, the limiting assembly 313 may include a first spring 3132. The first spring 3132 may be connected between the pressing portion 311 and the pressing arm 310 or between the lifting portion 312 and the pressing arm 310. In some embodiments, the first spring 3132 may be in a compressed state. The first spring 3132 may apply a thrust force on the pressing portion 311 or the lifting portion 312, such that the pressing portion 311 or the lifting portion 312 has a tendency to rotate toward the bottom wall of the case 100. By employing the first spring 3132, the pressure applied on the bills by the pressing portion 311 or the lifting portion 312 may be increased, thereby enhancing the effect of the pressing portion 311 or the lifting portion 312 to press the bills.

In some embodiments, after the pressing portion 311 or the lifting portion 312 is connected to the pressing arm 310 via the limiting screw 3131, the pressing portion 311 or the lifting portion 312 may rotate freely relative to the pressing arm 310. By providing the first spring 3132 between the pressing portion 311 and the pressing arm 310 or the lifting portion 312 and the pressing arm 310, the first spring 3132 may be utilized to adaptively adjust the angle between the pressing portion 311 and the pressing arm 310 or between the lifting portion 312 and the pressing arm 310 when pressing different thicknesses of bills, which is more convenient and reliable when in use.

In some embodiments, the reset member 320 may include a magnet. The reset member 320 may be magnetically attracted to the pressing arm 310, for example, attracting the pressing arm 310 to move in the direction close to the bottom wall of the case 100. In some embodiments, the pressing arm 310 may include a magnet or magnetic metal, for example, at least one of iron, stainless steel, nickel, etc.

In some embodiments, the reset member 320 may include an electromagnet. The electromagnet may include at least an iron core and a coil wrapped around the iron core, which may generate magnetic force by energizing the coil. The electromagnet may vary the strength of the magnetic field based on the current magnitude of the coil, which is convenient to adjust the attraction force of the electromagnet on the pressing arm 310 as needed, so that the pressing arm 310 provides a different magnitude of pressure on the bills.

In some embodiments, the coil of the electromagnet may be electrically connected to a power supply, which may be provided within the case 100. The power supply may be utilized to power the coil. In some embodiments, the power supply may be connected to a controller. The controller may collect and process data and generate control instructions. For example, the controller may control at least one of powering on, shutting down, changing the output current, etc. The controller may be a Programmable Logic Controller (PLC). By using the controller to control the power supply, automate and semi-automate control of the magnitude of the magnetic field of the electromagnet may be achieved, thus controlling the attraction force of the electromagnet on the pressing arm 310. In some embodiments, the controller may be disposed within the case 100.

In some embodiments, the reset member 320 may include a magnet and an electromagnet. The magnet may always exert an attraction force on the pressing arm 310, and the electromagnet may further exert an attraction force on the pressing arm 310 as needed.

In some embodiments, a state detection assembly may be provided within the case 100. The state detection component may be used to detect the motion state of the case 100. For example, the motion state may include at least one of a moving speed, an acceleration, etc., of the case 100. In some embodiments, the state detection component may include at least one of an acceleration sensor, a gyroscope, etc. In some embodiments, the state detection component may be communicatively connected to the controller. The state detection component may transmit detected motion states (e.g., the acceleration of the case 100, etc.) to the controller. In some embodiments, the controller may control the power source based on the motion state. For example, the controller may determine, based on the acceleration of the case 100, whether the acceleration satisfies a predetermined condition. The predetermined condition may include the acceleration of the case 100 being greater than or equal to an acceleration threshold. When the acceleration of the case 100 meets the predetermined condition, the controller may determine the case 100 to be in an abnormal state (e.g., accidental dropping, artificial throwing, etc.), and the controller may control the power supply to energize the coil of the electromagnet to cause the electromagnet to generate a magnetic field. By using the electromagnet to attract the pressing arm 310, the pressing effect of the pressing arm 310 on the bills can be enhanced. Alternatively, the controller may control the power supply to increase the operating power, i.e., increasing the current output to the coil, thereby enhancing the magnetic field of the electromagnet as well as the attraction effect of the electromagnet on the pressing arm 310, so as to further enhance the pressing effect of the pressing arm 310 on the bills. In some embodiments, the acceleration threshold is a preset value. In some embodiments, the output current of the power supply may be positively correlated with the acceleration. In some embodiments, the controller may determine the output current of the power supply in multiple ways based on the acceleration. For example, at least one of a predetermined algorithm, looking up a predetermined table, etc.

For example, the predetermined algorithm may include equation (1):

$$I = k \times a \quad (1)$$

Where I is the current, a is the acceleration, and k is the coefficient. The coefficient may be a preset value. The coefficient may be pre-stored in the controller.

For another example, the predetermined table may include historical currents, historical accelerations, and their correspondences in the historical data. By querying the predetermined table, the controller may determine a historical acceleration that is the same as or similar to the current acceleration and determine the historical current corresponding to the historical acceleration as the current target current. The predetermined table may be pre-stored in the controller.

The controller may determine the acceleration threshold and the coefficient in a variety of ways, for example, from historical data, manual input, etc.

In some embodiments, as shown in FIG. 1 and FIG. 2, the suitcase may further comprise a box 500 and a cover plate 600, and the top of the box 500 may form a second opening.

The box 500 may be used to hold other objects, for example, coins, etc. In some embodiments, the box 500 may be rotatably connected to an inner side wall of the case 100.

In some embodiments, the box 500 may include a box bottom plate and box side walls. The box side walls may be vertically connected to an edge of the box bottom plate. In some embodiments, the box side walls may surround the box bottom plate to form a second accommodation space.

The cover plate 600 may be used to control the opening or closing of the second accommodation space. In some embodiments, the cover plate 600 may include a first side 610 and a second side 620, and the first side 610 may be opposed to the second side 620. The first side 610 may be rotatably connected to the case lid 400. Both ends of the second side 620 may be slidably connected to the top of the two opposing inner side walls of the box 500, such that the cover plate 600 is capable of to closing the second opening in the opening/closing type.

In some embodiments, during a process of closing the first opening, the cover plate 600 may be moved to the top of the box 500 to close the second opening, and the box 500 may be moved through the first opening into the first accommodation space. During a process of opening the first opening, the box 500 may be moved through the first opening to the outside of the first accommodation space, and the cover plate 600 may be moved to open the second opening.

In some embodiments, the box 500 may include at least one first partition 510. The at least one first partition 510 may be provided within the box 500.

The at least one first partition 510 may be used to separate the second accommodation space. In some embodiments, the at least one first partition 510 may be disposed along the height of the box 500 (e.g., the Z direction in FIG. 1). In some embodiments, the plurality of first partitions 510 may be parallel to each other. In some embodiments, the at least one first partition 510 may be connected to the box bottom plate and/or the box side walls, such that the second accommodation space of the box 500 may be separated into more than two subspaces. In some embodiments, the subspaces may form coin compartments 511 for holding coins. In some embodiments, the at least one first partition 510 may be provided along a front-to-back direction (e.g., the X direction in FIG. 1). A coin compartment 511 may be formed between two adjacent first partitions 510, or between one first partition 510 and side walls of the box 500.

In some embodiments, the box 500 may be rotatably connected to an inner side wall of the case 100, as shown in FIG. 1. In some embodiments, the cover plate 600 may be rotatably connected to the case lid 400. In some embodiments, the cover plate 600 may include a first side 610 and a second side 620, and the first side 610 may be opposite to the second side 620. In some embodiments, the first side 610 may be rotatably connected to an inner side wall of the case lid 400. Both ends of the second side 620 may be slidably connected to the tops of two opposing inner side walls of the box 500, such that the cover plate 600 is capable of closing the second opening in the opening/closing type. When the case lid 400 is rotated, the first side 610 of the cover plate 600 may be rotated relative to the case lid 400, and the first side 610 of the cover plate 600 may be slid relative to the tops of the inner side walls of the box 500. When the case lid 400 is rotated, the cover plate 600 may be driven to rotate, and a force may be applied on the box 500 through the cover plate 600 to drive the box 500 to move. When the case lid 400 is closed over the case 100, the cover plate 600 may be fully covered over the box 500 to completely close the second opening.

Figure 7:
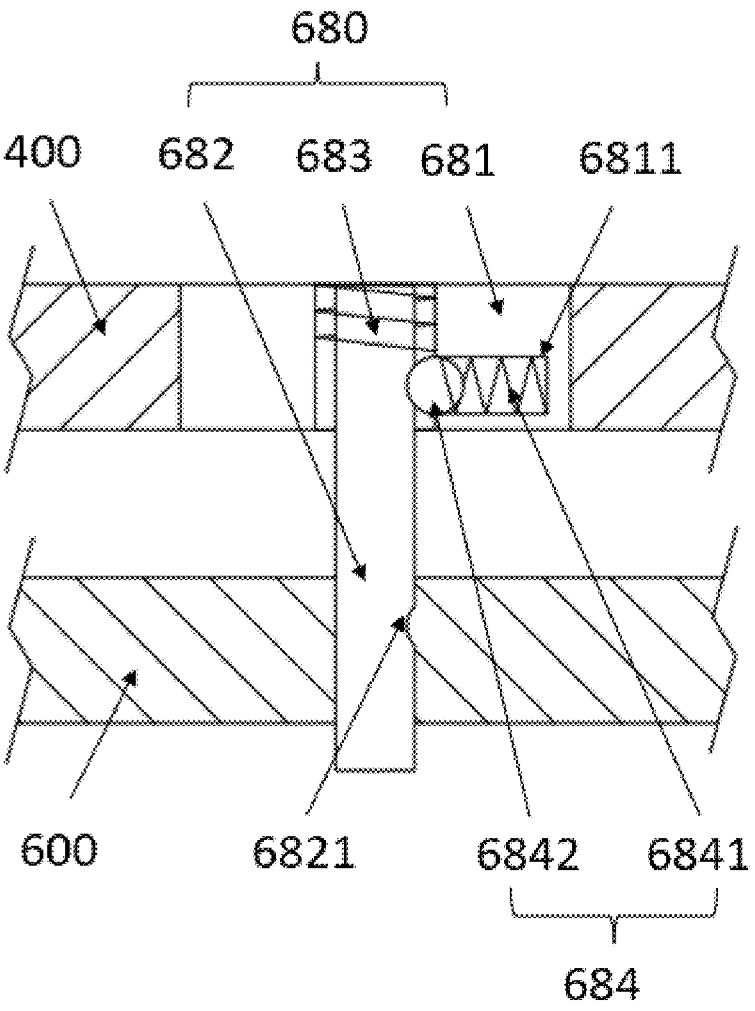
FIG. 7 is a schematic diagram illustrating a structure of an active button in a connected state according to some embodiments of the present disclosure.
Figure 8:
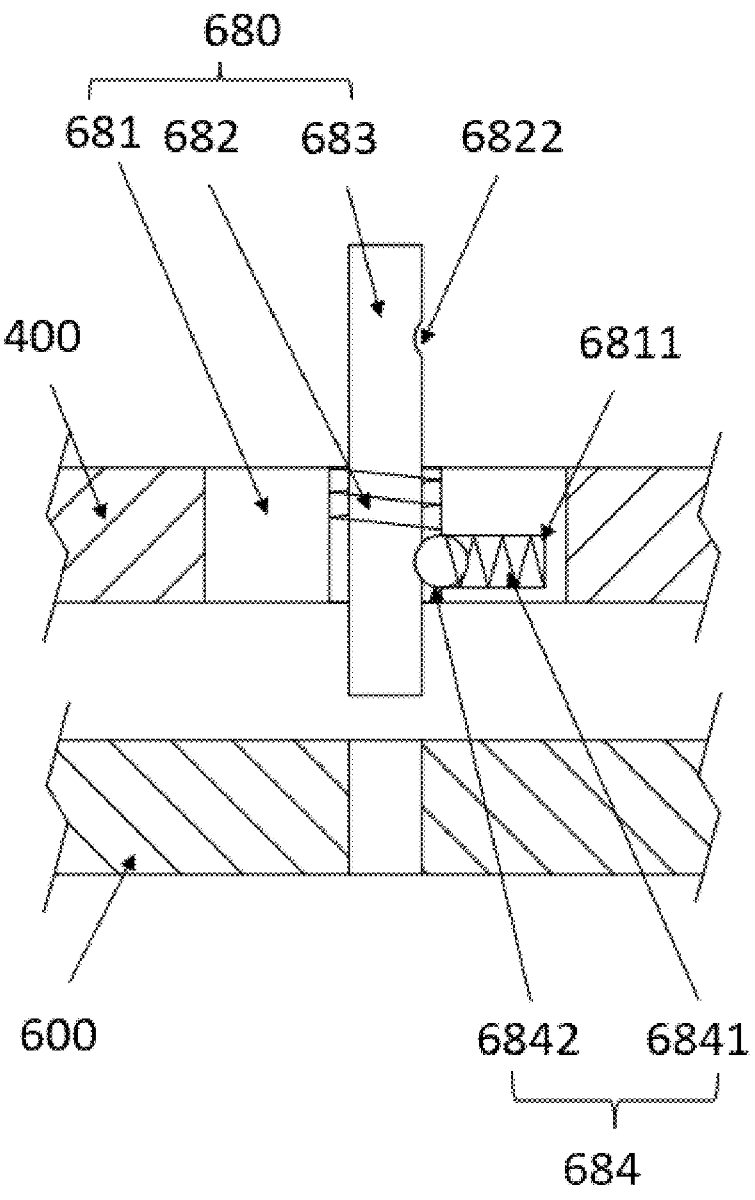
FIG. 8 is a schematic diagram illustrating a structure of an active button in a disconnected state according to some embodiments of the present disclosure.

FIG. 7 is a schematic diagram illustrating a structure of an activity button in a connected state according to some embodiments of the present disclosure. FIG. 8 is a schematic diagram illustrating a structure of an activity button in a disconnected state according to some embodiments of the present disclosure.

In some embodiments, the cover plate 600 may be detachably and rotatably connected to the case lid 400 in a variety of ways. In some embodiments, the cover plate 600 may be connected to the case lid 400 via an activity button 680. In some embodiments, each end of the cover plate 600 may be connected to the case lid 400 via at least one activity button 680.

The activity button 680 may change the connection state of the cover plate 600 and the case lid 400. In some embodiments, the activity button 680 may switch between a connected state and a disconnected state.

As shown in FIG. 7, when the activity button 680 is in the connected state, the activity button 680 may be connected to the cover plate 600 and the case lid 400 at the same time, and when the case lid 400 is rotated, the cover plate 600 may be driven to rotate synchronously by the activity button 680.

As shown in FIG. 8, when the activity button 680 is in the disconnected state, the activity button 680 may be disconnected from the case lid 400, and when the case lid 400 is rotated, the cover plate 600 may not be driven to rotate synchronously, so that the cover plate 600 is always covered on the box 500, avoiding the coins inside the box 500 from falling out during the rotation of the case lid 400.

In some embodiments, the activity button 680 may include a connection part 681 and a pressing part 682, as shown in FIG. 7 and FIG. 8.

The connection part 681 may be connected to the cover plate 600.

At least a portion of the pressing part 682 may be separately connected to the case lid 400. In some embodiments, at least a portion of the pressing part 682 may be slidably connected to the connection part 681. In some embodiments, the pressing part 682 may include a variety of shapes, for example, at least one of a cylindrical shape, a threaded rod, etc. In some embodiments, the pressing part 682 may be threaded through the connection part 681. In some embodiments, the pressing part 682 may be threaded through the case lid 400.

Figure 9:
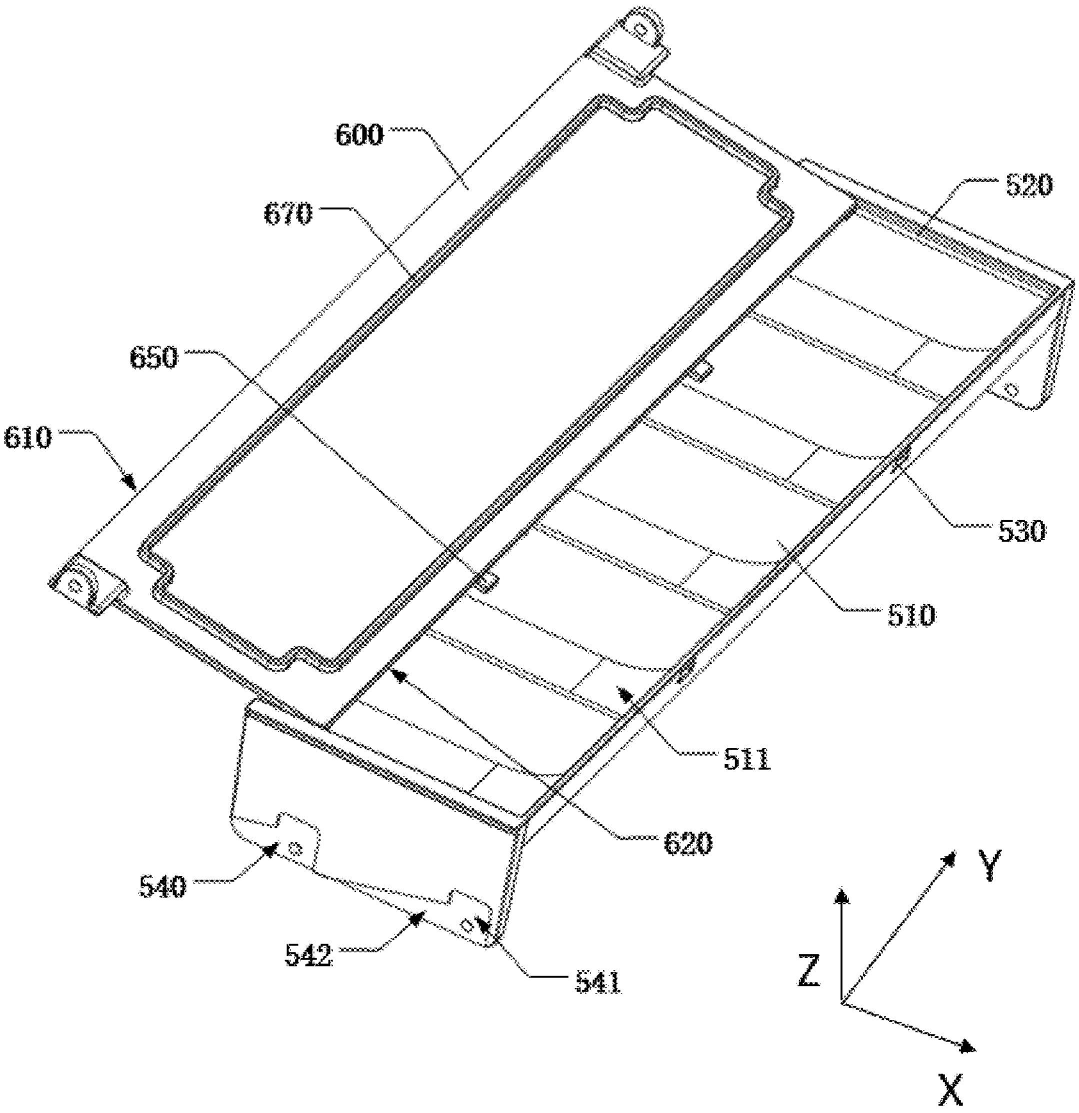
FIG. 9 is a schematic diagram illustrating a box and a cover plate of a portable suitcase in an open state according to some embodiments of the present disclosure.

In some embodiments, a sliding direction of the pressing part 682 relative to the connection part 681 may be parallel to the length direction of the cover plate 600 (e.g., the Y direction in FIG. 9). By applying pressure to the pressing part 682, the pressing part 682 may be slid relative to the connection part 681, thereby switching the activity button 680 between the connected state and the disconnected state.

In some embodiments, the activity button 680 may include a second spring 683. The second spring 683 may be connected between the pressing part 682 and the connection part 681. When the user applies pressure to the pressing part 682, the pressing part 682 may transfer the pressure to the second spring 683, causing the second spring 683 to be compressed or further compressed. In some embodiments, when the activity button 680 is in the connected state, the second spring 683 may be in a natural state or a compressed state. The second spring 683 may be in a compressed state when the activity button 680 is in the disconnected state. The degree of compression of the second spring 683 when the activity button 680 is in the disconnected state may be greater than the degree of compression of the second spring 683 when the activity button 680 is in the connected state.

In some embodiments, the activity button 680 may include a locking structure 684.

The locking structure 684 may be used to limit the relative position of the pressing part 682 and the connection part 681. For example, when the activity button 680 is in a connected state or a disconnected state, the locking structure 684 may lock the pressing part 682 and the connection part 681 at different relative positions, respectively.

In some embodiments, the locking structure 684 may include a third spring 6841 and a locking bead 6842. The inner surface of the connection part 681 may be provided with a locking hole 6811, and the axis of the locking hole 6811 may be perpendicular to the movement direction of the pressing part 682. In some embodiments, a third spring 6841 may be provided in the locking hole 6811, and the locking bead 6842 may be connected to the third spring 6841. The locking bead 6842 may be slidably disposed within the locking hole 6811. In some embodiments, at least a portion of the locking bead 6842 may extend out from the locking hole 6811 when the third spring 6841 is in the natural state. In some embodiments, the third spring 6841 may be in a natural state or a compressed state. In some embodiments, the pressing part 682 may be provided with at least one limiting hole that adapts to the locking bead 6842. In some embodiments, the at least one limiting hole may include a first limiting hole 6821 and a second limiting hole 6822. The first limiting hole 6821 and the second limiting hole 6822 may be distributed along an axial direction of the pressing part 682. In some embodiments, the distance of the first limiting hole 6821 from the case lid 400 may be less than the distance of the second limiting hole 6822 from the case lid 400.

When the activity button 680 is in the connected state, the second limiting hole 6822 may be installed in conjunction with the locking bead 6842.

When the activity button 680 is in the disconnected state, the first limiting hole 6821 may be installed in conjunction with the locking bead 6842.

When the activity button 680 is switched between the connected state and the disconnected state, the user may apply pressure to the pressing part 682, and the pressing part 682 may apply pressure to the locking bead 6842 to press the locking bead 6842 into the locking hole 6811, such that the pressing part 682 and the connection part 681 may slide relative to each other. When the first limiting hole 6821 or the second limiting hole 6822 is aligned with the locking bead 6842, the third spring 6841 may push the locking bead 6842 into the first limiting hole 6821 or the second limiting hole 6822. After the user withdraws the force applied to the pressing part 682, the locking bead 6842 may lock the pressing part 682.

By using the activity button 680, the cover plate 600 may be connected or disconnected to the case lid 400 as needed, thereby enhancing the flexibility of the cover plate 600. The bill compartments may be opened only without opening the coin compartments as needed, for example, when the suitcase is tilted, the box 500 may also be tilted, which may prevent the case lid 400 from driving the cover plate 600 open, causing coins to fall out.

In some embodiments, the projection of the first limiting hole 6821 and the second limiting hole 6822 may have an angular relationship along the axial direction of the pressing part 682.

In some embodiments, the pressing part 682 may rotate around its own axis during a sliding process of the pressing part 682 relative to the connection part 681. When the activity button 680 is switched from the disconnected state to the connected state, the user may apply pressure to the pressing part 682 to move the pressing part 682 along a direction away from the case lid 400, so that the first limiting hole 6821 is disengaged from the locking bead 6842, and to rotate the pressing part 682, so that the first limiting hole 6821 is misaligned with the locking bead 6842. The user may withdraw pressure applied on the pressing part 682, and the second spring 683 may push the pressing part 682 along a direction proximate the case lid 400 until the second limiting hole 6822 is connected to the locking bead 6842.

In some embodiments, the pressing part 682 may be rotated about its own axis in a variety of ways. For example, the user applies a torque to the pressing part 682, causing the pressing part 682 to rotate about its own axis. For another example, the outer surface of the pressing part 682 may be provided with at least one helical groove, and the connection part 681 may be provided with at least one limiting block slidingly connected to the at least one helical groove. When the user applies pressure to the pressing part 682, the pressing part 682 may be rotated about its own axis due to the cooperation of the at least one helical groove with the at least one limiting block. When the activity button 680 is switched between the disconnected state and the connected state, it can avoid that the first limiting hole 6821 or the second limiting hole 6822 mistakenly contacts the locking bead 6842, thereby affecting the use.

In some embodiments, the second spring 683 may be in a compressed state when the activity button 680 is in the disconnected state, and when the user applies pressure to the pressing part 682 to cause the first limiting hole 6821 to separate from the locking bead 6842, the second spring 683 may be further compressed. When the user withdraws the pressure applied on the pressing part 682, the spring force of the second spring 683 may be greater than the spring force of the third spring 6841, and the second spring 683 may push the pressing part 682 to compress the locking bead 6842, preventing the locking bead 6842 from connecting with the first limiting hole 6821, causing the pressing part 682 to fail to be ejected.

In some embodiments, the first limiting hole 6821 and the second limiting hole 6822 may be annular holes, and the first limiting hole 6821 and the second limiting hole 6822 may be disposed along a circumferential direction of the pressing part 682, respectively, which can increase the area of the first limiting hole 6821 and the second limiting hole 6822 and more conveniently align the first limiting hole 6821 or the second limiting hole 6822 with the locking bead 6842.

In some embodiments, the case lid 400 may be provided with a bar-shaped hole, and the pressing part 682 may be threaded through the bar-shaped hole. A swivel catch may be connected to one end of the pressing part 682 proximate to the case lid 400. The swivel catch may adapt to the bar-shaped hole. In some embodiments, the swivel catch may be rotatably connected to the pressing part 682. When the swivel catch is aligned with the bar-shaped hole, the swivel catch may pass through the bar-shaped hole. When the swivel catch is misaligned with the bar-shaped holes, the swivel catch may not pass through the bar-shaped hole. By adopting the swivel catch and the bar-shaped hole, the user can adjust the angle of the swivel catch and the bar-shaped hole as needed to avoid mistakenly touching the activity button 680.

Figure 10:
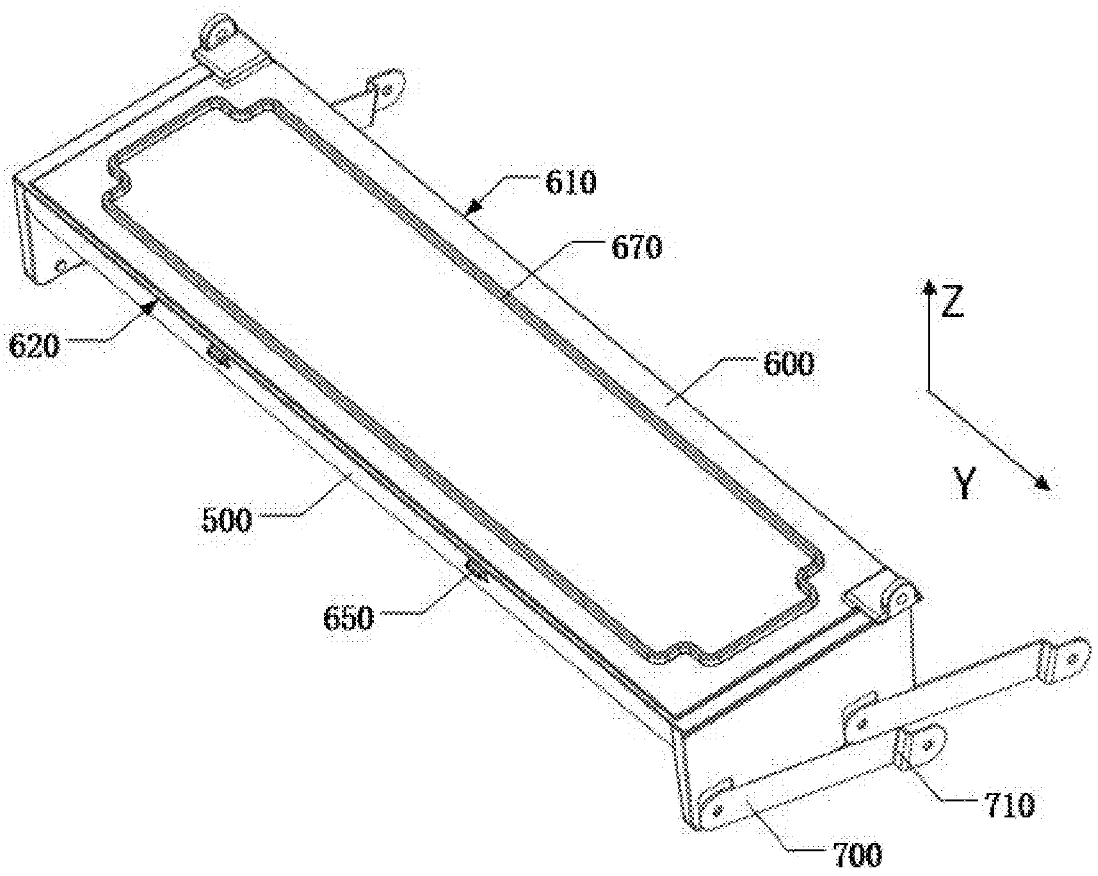
FIG. 10 is a schematic diagram illustrating of a box and a cover plate of a portable suitcase in a closed state according to some embodiments of the present disclosure.
Figure 11:
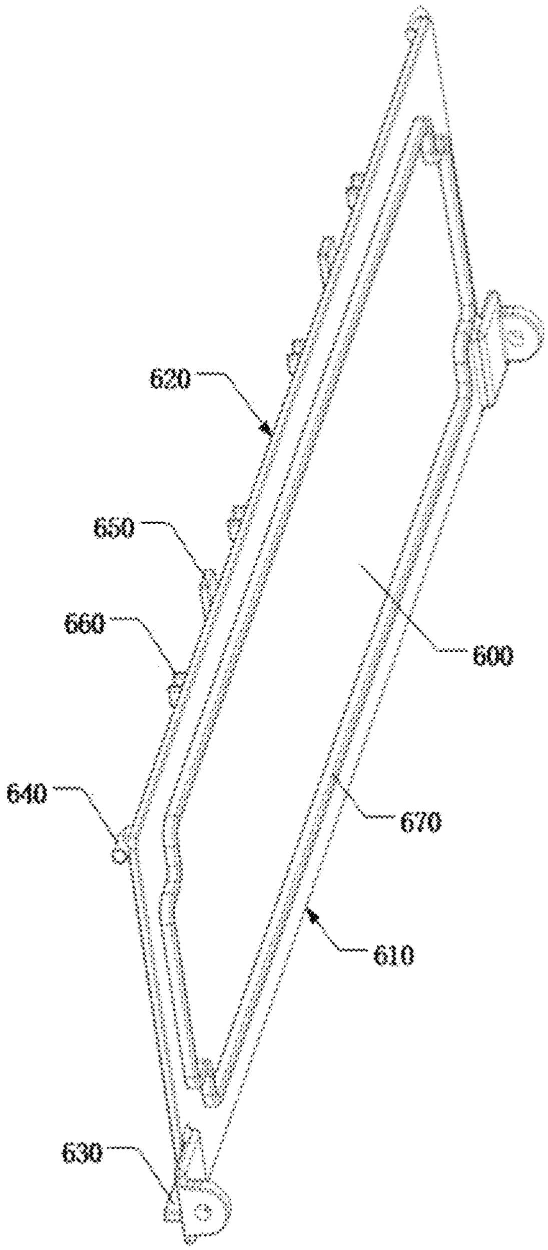
FIG. 11 is a schematic diagram illustrating the structure of a cover plate in a portable suitcase according to some embodiments of the present disclosure.

FIG. 9 is a schematic diagram illustrating a box and a cover plate of a portable suitcase in an open state according to some embodiments of the present disclosure. FIG. 10 is a schematic diagram illustrating a box and a cover plate of a portable suitcase in a closed state according to some embodiments of the present disclosure. FIG. 11 is a schematic diagram illustrating the structure of a cover plate in a portable suitcase according to some embodiments of the present disclosure.

In some embodiments, the box 500 may be located above the case 100 when the second opening is opened, as shown in FIG. 1 and FIG. 11. The connection between the first side 610 of the cover plate 600 and the case lid 400 may be located above the connection between the case lid 400 and the case 100. Because the second side 620 is slidably connected to the box 500, the second side 620 of the cover plate 600 may be slid to the side of the box 500 proximate to the case lid 400, and the cover plate 600 may be always located above the box 500, so that the lower surface of the cover plate 600 may form an angle with the upper surface of the box 500.

Therefore, during the rotation process of the case lid 400, the cover plate 600 may be not collided with the box 500, avoiding vibration of the box 500 that causes the coins to fall out, and damage caused by collision between the box 500 and the cover plate 600.

In some embodiments, the portable suitcase may further comprise at least two linkage arms 700, as shown in FIG. 9 and FIG. 10. The box 500 may be connected to an inner side wall of the case 100 via the at least one linkage arm 700.

The linkage arm 700 may provide support to the box 500 and rotates relative to the box 500. In some embodiments, one end of the linkage arm 700 may be rotationally connected to the box 500, and the other end of the linkage arm 700 may be rotationally connected to the case 100. For example, one end of the linkage arm 700 may be rotationally connected to an outer side wall of the box 500, and the other end of the linkage arm 700 may be rotationally connected to an inner side wall of the case 100. When the first opening is opened, the linkage arms 700 located on the same side of the box 500 may be parallel to each other.

In some embodiments, the linkage arm 700 may be a bar-shaped structure. In some embodiments, one end of the linkage arm 700 may be hinged to an outer side wall of the box 500, and the other end of the linkage arm 700 may be hinged to an inner side wall of the case 100, such that the box 500 and the case 100 may be rotatably connected. In some embodiments, at least two linkage arms 700 may be provided at each end of the box 500 along the length direction of the box 500 (e.g., the Y direction in FIG. 10). In some embodiments, the at least two linkage arms 700 disposed on the same side of the box 500 may be parallel to each other, and the centers of rotation of the at least two linkage arms 700 may form a parallelogram. When the linkage arms 700 drive the box 500 to rotate, the box 500 does not rotate and always remain stable, avoiding coins falling out of the box 500. In some embodiments, the top end may be higher than the bottom end in a vertical direction (e.g., the Z direction in FIG. 10).

In some embodiments, as shown in FIG. 9 and FIG. 10, at least one groove 540 may be provided on the side wall of the box 500, and at least a portion of the at least one linkage arm 700 may be rotatably disposed inside the groove 540. By connecting the at least one linkage arm 700 to the at least one groove 540, it can avoid that the linkage arm 700 forms a protrusion located on the outer side of the box 500, which is conducive to improving the space utilization.

In some embodiments, the groove 540 may include a first groove 541 and a second groove 542. The first groove 541 may be provided along a height direction of the box 500 (e.g., the Z-direction in FIG. 9), and the second groove 542 may be connected to the bottom end of the first groove 541. In some embodiments, the second groove 542 may be provided obliquely toward a direction of the avoidance space 111. In some embodiments, at least a portion of the linkage arm 700 (e.g., the tip of the linkage arm 700) may be rotatably disposed within the first groove 541. At least a portion of the linkage arm 700 (e.g., at least a portion of the linkage arm 700 below the end portion of the linkage arm 700) may be rotated into the second groove 542 when the case lid 400 is closed.

When at least a portion of the linkage arm 700 (e.g., an end portion of the linkage arm 700) is disposed inside the first groove 541, the box 500 may be driven by the linkage arm 700 to above the avoidance space 111, so that the box 500 is fixed relative to the case 100. When at least a portion of the linkage arm 700 (e.g., at least a portion of the linkage arm 700 below the end portion of the linkage arm 700) is rotated from the interior of the first groove 541 into the interior of the second groove 542, the box 500 may be driven by the linkage arm 700 into the interior of the storage space because the second groove 542 is provided obliquely towards a direction of the avoidance space 111. When the case lid 400 drives the box 500 to move, the second groove 542 may provide a space for movement of the linkage arm 700 to avoid interference between the linkage arm 700 and the box 500.

In some embodiments, as shown in FIG. 9 and FIG. 10, the bottom end of the linkage arm 700 may form a bent portion 710 toward the interior of the case 100, and the bent portion 710 may be rotatably connected to the interior wall of the case 100, so that a certain gap is formed between the side wall of the box 500 and the inner wall of the case 100, thereby avoiding collision and interference when the box 500 moves between the avoidance space 111 and the storage space, and improving the safety of the suitcase when it is opened and closed.

In some embodiments, as shown in FIG. 6, when side walls of the box 500 is hinged to inner side walls of the case 100 via at least one linkage arm 700, the second partition 120 may be provided with an avoidance groove 121. When the at least one linkage arm 700 pulls the box 500 into the storage space, the at least one linkage arm 700 may pass through the avoidance groove 121 to extend into the storage space, The avoidance groove 121 may be used to avoid the linkage arm 700. In some embodiments, the at least one linkage arm 700 may be disposed at both ends of the second partition 120. When the cover plate 600 drives the box 500 to rotate in or out relative to the first accommodation space 110 within the case 100, at least a portion of the linkage arm 700 may pass through the avoidance groove 121 and move between the storage space and the avoidance space 111, so the avoidance groove 121 may avoid interfering between the linkage arm 700 with the second partition 120 during the reciprocating movement, making the components in the suitcase more tightly in the closed state to realize the miniaturized design of the storage case.

Figure 13:
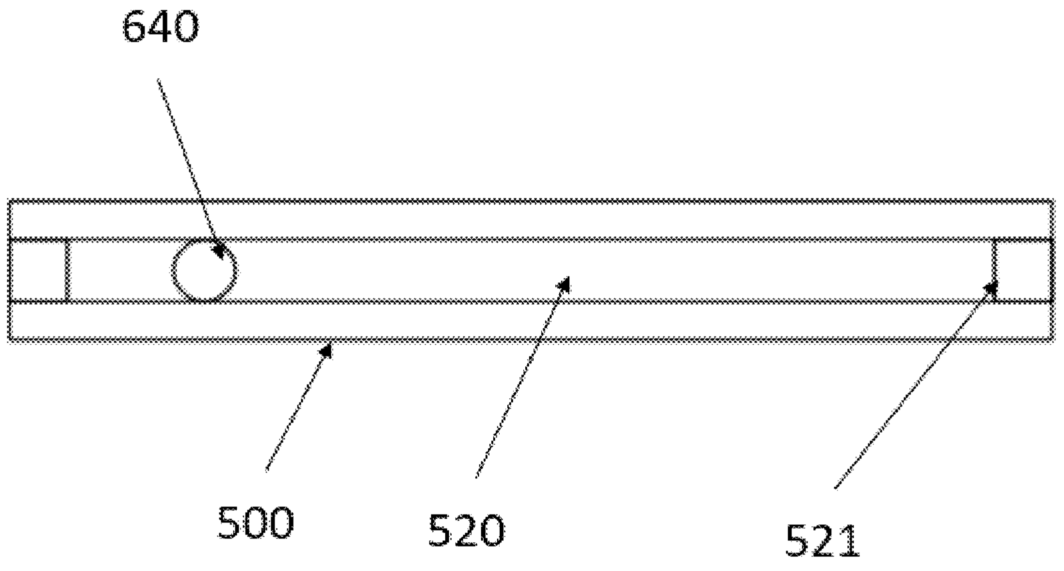
FIG. 13 is a schematic diagram illustrating the structure of a linear slide groove according to some embodiments of the present disclosure.

In some embodiments, the front side wall of the box 500 may have an arc-shaped structure, as shown in FIG. 9 and FIG. 13. The front side wall of the box 500 may have an arc-shaped cross-section along its axial direction (e.g., the Y-direction in FIG. 9), and a concave surface of the arc-shaped cross-section may be oriented toward an interior of the box 500. The front side wall of the box 500 adopts the arc-shaped structure, which can facilitate coins to slide into the interior of the coin compartments 511 and also facilitate the user to retrieve coins from the coin compartments 511. When the box 500 is stored inside the storage space, a gap between the box 500 and the compression assembly can be increased using the arc-shaped structure, thereby preventing interference between the box 500 and the compression assembly when the suitcase is closed, which not only improves the safety of the suitcase when opening and closing and user experience, but also realizes the miniaturization design of the suitcase.

Figure 12:
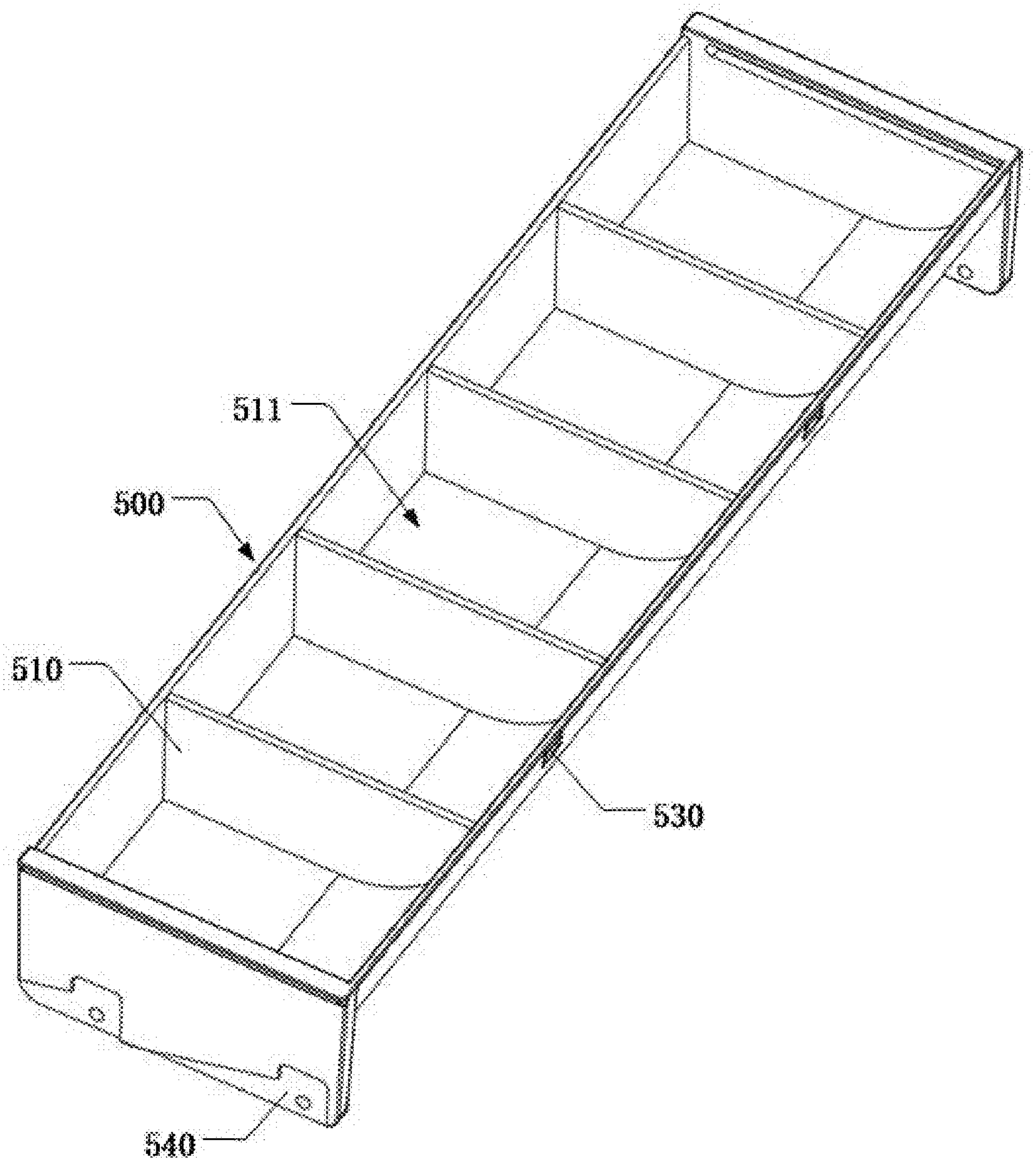
FIG. 12 is a schematic diagram illustrating the structure of a box in a portable suitcase according to some embodiments of the present disclosure.

FIG. 12 is a schematic diagram illustrating the structure of a box in a portable suitcase according to some embodiments of the present disclosure.

In some embodiments, the portable suitcase may further comprise two linear slide grooves 520 disposed oppositely, and two sliders 640. In some embodiments, the slide grooves 520 may be slidably connected to the sliders 640. The sliders 640 may slide along the length direction of the linear slide grooves 520.

In some embodiments, as shown in FIGS. 9-12, the two slide grooves 520 are respectively recessed downwardly at the tops of two opposite side walls of the box 500, for example, at the top of two side walls of the box 500 along the length direction (e.g., the Y direction in FIG. 9).

In some embodiments, the two sliders 640 may protrude from each end of the second side of the cover plate 600, as shown in FIG. 11. In some embodiments, the two sliders 640 may be snapped into each of the two slide grooves 520.

In some embodiments, the slide groove 520 may include a linear slide groove. In some embodiments, the slide grooves 520 may be arranged along the front-to-back direction of the box 500 (e.g., the X direction in FIG. 9).

In some embodiments, the slider 640 may include a variety of shapes, for example, at least one of cylindrical, spherical, etc. In some embodiments, the slider 640 may be rotatably connected to the cover plate 600. In some embodiments, the slider 640 may be connected to the cover plate 600 in a rolling manner. In some embodiments, the centerline of sliders 640 may be perpendicular to the length direction of the slide grooves 520 (e.g., the X direction in FIG. 9). When the sliders 640 is snapped into the interior of the slide grooves 520, the sliders 640 may slide along a straight line relative to the slide grooves 520 and simultaneously rotate along its own centerline within the linear slide groove 520, which can reduce the friction and wear of the slider 640 and the linear slide groove 520.

In some embodiments, during the process of opening and closing the second opening, the first side of the cover plate 600 may rotate relative to the case lid, and the second side of the cover plate 600 may slide along the extension direction of slide grooves 520. When the cover plate 600 is opened and closed relative to the box 500, since sliders 640 slide within the slide grooves 520, and the center surface of the cover plate 600 forms an angle with the upper surface of the box 500 in the open state of the coin compartments 511, the sliders 640 may also rotate along its own centerline while sliding in the opening direction of the slide grooves 520, making the movement of the cover plate 600 relative to the box 500 smoother and more convenient.

FIG. 13 is a schematic diagram illustrating the structure of a slide groove according to some embodiments of the present disclosure.

In some embodiments, an isolation layer may be provided within the slide groove 520.

The isolation layer may be used to isolate the slider 640 from the slide groove 520. In some embodiments, the isolation layer may be made of various materials, such as at least one of a rubber sheet, a fiber cloth sheet, etc. By adopting the isolation layer, direct contact between the slider 640 and the linear slide groove 520 can be avoided, reducing wear between the slider 640 and the slide groove 520, avoiding deformation of slider 640 and the slide groove 520 due to long-term use, and avoiding asymmetry of sliders 640 or slide grooves on both sides of the box 500 due to wear, so as to prevent the box 500 and the cover plate 600 from getting stuck when they move relative to each other caused by structural asymmetry.

In some embodiments, the isolation layer may be detachably connected to the slide groove 520 in a variety of ways, for example, at least one of snap-fit connection, bonding, etc.

In some embodiments, the isolation layer may be used to increase the friction between the slider 640 and the slide groove 520, forming a damping connection between the slider 640 and the slide groove 520. When the case lid 400 is rotated at different angles, the slider 640 and the slide groove 520 may be at different relative positions. The damping connection between the slider 640 and the slide groove 520 can cause the case lid 400 to keep stable when rotated to any angle, which also avoids vibration of the box 500 caused by the relative sliding between the slider 640 and the slide groove 520, so as to avoid coins in the box 500 falling out due to vibration.

In some embodiments, a locking member 521 may be provided at each end of the slide groove 520.

The locking member 521 may limit the movement range of the slider 640 within the slide groove 520, so as to prevent the slider 640 from disengaging from the slide groove 520. In some embodiments, the locking member 521 may include an elastic material, for example, rubber, silicone, etc. In some embodiments, the locking member 521 may be made of an elastomeric material. In some embodiments, an elastic cushion layer may be provided on an outer side of the locking member 521, which can reduce the impact of the slider 640 on the locking member 521 and avoid damage to the slider 640 or the locking member 521 due to impact.

In some embodiments, the locking member 521 may be detachably connected to the box 500 in a variety of ways, for example, at least one of snap-fit connection, threaded connection, etc. In some embodiments, the locking member 521 may press the isolation layer inside the linear slide groove 520. The isolation layer may be replaced after the locking member 521 is removed.

In some embodiments, as shown in FIGS. 9-13, the portable suitcase may further comprise at least one limiting block 650 and at least one limiting slot 530 or at least one limiting hole. In some embodiments, the at least one limiting block 650 may be adapted to fit into the limiting slot 530 or the at least one limiting hole. In some embodiments, the at least one limiting block 650 may be connected to the at least one limiting slot 530 or the at least one limiting hole. The connection may include at least one of a snap-fit connection, a tight expansion connection, etc.

In some embodiments, when the second opening is opened, the at least one limiting block 650 may protrude from the top of a side wall of the cover plate 600 away from a side of the cover plate (e.g., the second side 620 of the cover plate 600). In some embodiments, when the second opening is opened, the at least one limiting slot 530 or the at least one limiting hole may be disposed at the top of the side wall of the box 500 away from a side of the cover plate (e.g., the second side 620 of the cover plate 600).

When the cover plate 600 closes the box 500, causing that the second opening is closed, the at least one limiting block 650 may be correspondingly snapped into the at least one limiting slot 530 or the at least one limiting hole, so as to improve the snap-fitting precision between the cover plate 600 and the box 500 while ensuring that the coin compartments 511 are in a completely closed state to avoid the coins falling out during carrying and transportation. In some embodiments, the at least one limiting block 650 may be made of an elastic material, for example, at least one of rubber, silicone, etc. In some embodiments, the limiting block 650, the limiting slot 530, or the limiting hole may be made of a magnetic material. The at least one limiting block 650 may be magnetically connected to the at least one limiting slot 530 or the at least one limiting hole, respectively.

Figure 14:
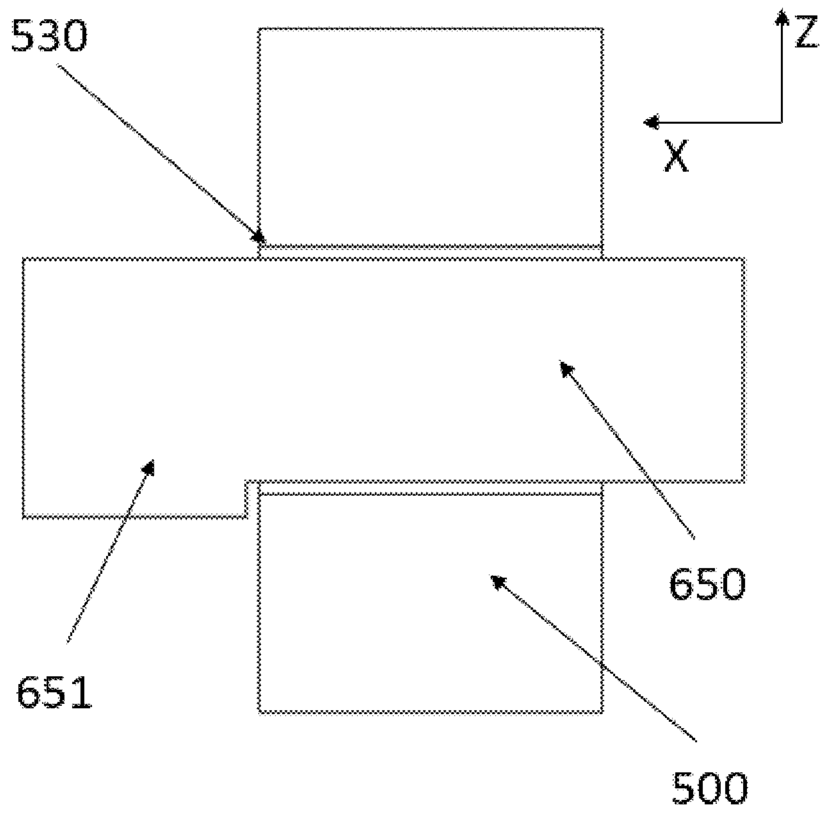
FIG. 14 is a schematic diagram illustrating the structure of a limiting block according to some embodiments of the present disclosure.

FIG. 14 is a schematic diagram illustrating the structure of a limiting block according to some embodiments of the present disclosure.

In some embodiments, one end of the limiting block 650 near the box 500 may be provided with a protrusion 651, as shown in FIG. 14.

The protrusion 651 is at least one protruding structure on the outer surface relative to the limiting block 650. The protrusion 651 may protrude in the direction perpendicular to the length direction of the limiting block 650 (the X direction in FIG. 14). When the cover plate 600 closes the box 500, the protrusion 651 may pass through the limiting slot 530 or the limiting hole and form snap-fitting with the box 500. In the absence of an external force, due to the presence of the protrusion 651, the limiting block 650 cannot be separated from the limiting slot 530 or the limiting hole, improving the strength of the connection in which the cover plate 600 closes the box 500. For example, when the suitcase is tilted or placed vertically, the box inside the suitcase is also tilted or placed vertically, and the protrusion 651 is beneficial in prevent the cover plate 600 from separating from the box 500, so as to avoid coins falling out.

In some embodiments, the protrusion 651 may be made of an elastic material, for example, at least one of rubber, silicone, etc.

In some embodiments, the corner between the protrusion 651 and the limiting block 650 may be filleted corner. In some embodiments, the protrusion 651 may be a variety of shapes, for example, at least one of prismatic, hemispherical, semi-cylindrical, etc.

In some embodiments, the protrusion 651 and the limiting block 650 may be connected in a variety of ways, for example, at least one of bonding, snap-fit connection, threaded connection, integral molding, etc.

In some embodiments, at least one outer surface of the protrusion 651 may be provided with a friction surface, which can increase friction to achieve anti-slip and improved connection strength.

In some embodiments, multiple bumps may be provided on the friction surface. A bump refers to a structure that protrudes outward from the friction surface. The multiple bumps may be evenly distributed on the friction surface.

In some embodiments, a fiber cloth block may be attached to the friction surface, which may be used to increase the friction on the friction surface. In some embodiments, the friction surface and the fiber cloth block may be attached in multiple ways, for example, bonding, threaded connection, etc.

In some embodiments, as shown in FIG. 12, the cover plate 600 may include a flat plate, a stiffener 670, and a limiting plate 630. The stiffener 670 may be provided on at least one surface of the flat plate.

The stiffeners 670 may be used to increase the strength and deformation resistance of the cover plate 600. In some embodiments, the stiffeners 670 may protrude from the upper surface of the flat plate. In some embodiments, the flat plate may have various shapes, for example, at least one of a rectangle, a rounded rectangle, etc. In some embodiments, the stiffener 670 may be arranged in an annular shape at the edge of the flat plate. By using the stiffener 670, the deformation of the cover plate 600 after long-term use may be avoided, ensuring the snap-fitting precision between the cover plate 600 and the box 500. In some embodiments, the stiffener 670 and the flat plate may be connected in various ways, for example, bonding, welding, integral molding, etc.

In some embodiments, the limiting plate 630 may be used to limit the relative position between the cover plate 600 to the box 500, as illustrated in FIGS. 9-13. In some embodiments, the limiting plate 630 may be vertically connected to the lower surface of the flat plate and may be positioned at the edge of the flat plate near the side of the case 100. That is, the limiting plate 630 may be provided at least one end of the cover plate 600 along the length direction (e.g., the Y direction in FIG. 10), and may extend in a direction perpendicular to the cover plate 600 and toward the box 500. When the second opening is closed, and the cover plate 600 may be covered above the box 500 to close the coin compartments 511, the limiting plate 630 may be pressed against an outer wall of the box. For example, the limiting plate 630 may be pressed against the rear side wall of the box 500, thereby limiting the relative position between the cover plate 600 to the box 500.

When the limiting plate 630 is pressed against the rear side wall of the box 500, the limiting plate 630 may limit the limit position of the forward movement of the cover plate 600 relative to the box 500, thereby improving the snap-fitting precision between the cover plate 600 and the box 500.

In some embodiments, at least one block 660 may be provided at the lower surface of the second side 620, as shown in FIGS. 9-13. The block 660 may be adapted to fit with the first partition 510. In some embodiments, the block 660 may be an inverted U-shaped structure. In some embodiments, the block 660 may be connected to the first partition 510 in correspondence, such that the block 660 may be snapped to the top of the first partition 620. The block 660 may slide relative to the first partition 510 when the cover plate 600 moves relative to the box 500. When the slider 640 is disposed at the rear side end of the slide groove 520, the box 500 may be in the open state, and the block 660 may be snapped to the rear side end of the first partition 510. During the process of gradual covering the cover plate 600 to the box 500, the block 660 may gradually move from the rear side end of the first partition plate 510 to the front side end of the first partition plate 510, thereby improving the precision and stability of the movement of the cover plate 600.

In some embodiments, as shown in FIG. 3, a top wall of the case lid 400 may be recessed in a direction toward the case 100 to form a mounting groove 410, while the case lid 400 may be provided with a handle 420 and disposed within the mounting groove 410, so as to facilitate the carrying and transportation of the suitcase.

In some embodiments, as shown in FIGS. 1-13, during the process of opening the suitcase, the case lid 400 may be rotated by a certain angle relative to the case 100, such that the case lid 400 is gradually opened toward the front side of the suitcase. Since the first side 610 of the cover plate 600 is rotatably connected to the case lid 400, the case lid 400 may apply a pulling force on the cover plate 600 when it is rotated, such that the cover plate 600 slides backwards relative to the box 500 by the pulling force, so as to gradually opening the coin compartments 511.

At the same time, the case lid 400 may apply a pulling force on the box 500, and since the box 500 is rotatably connected to the case 100, the box 500 may be gradually pushed out of the first accommodation space 110 under the pulling force.

When the suitcase is in the open state, the box 500 may be pushed from the storage space to above the avoidance space 111, and at the same time, the second side 620 of the cover plate 600 may be moved to the limit position of the rear side, so that both the coin compartments 511 and the bill compartments 210 are opened to facilitate the user to pick up and place the bills and coins.

During the process of closing the suitcase, the case lid 400 may be rotated along a direction proximate to the case 100, such that the case lid 400 is gradually closed toward the front side of the suitcase. Because the first side 610 of the cover plate 600 is rotatably connected to the case lid 400, the case lid 400 may apply a thrust force on the cover plate 600 when it is rotated, such that the cover plate 600 slides forward relative to the box 500 under the thrust force, thereby gradually closing the coin compartments 511.

At the same time, the case lid 400 may apply a thrusting force on the box 500, and since the box 500 is rotatably connected to the case 100, the box 500 may be gradually pushed into the interior of the first accommodation space 110 under the thrusting force.

When the suitcase is in the closed state, the box 500 may be pushed from above the avoidance space 111 into the storage space, and at the same time, the second side 620 of the cover plate 600 may be moved to the limit position of the front side, so that the coin compartments 511 are closed, so as to facilitate the transportation and carrying of the suitcase by the user.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Similar modifications, improvements, and corrections are suggested in the present disclosure, so similar modifications, improvements, and corrections are still within the spirit and scope of some embodiments of the present disclosure.

Also, the present disclosure uses specific words to describe embodiments of the present disclosure, such as "an embodiment", "one embodiment", and/or "some embodiments" means a feature, structure, or characteristic associated with at least one embodiment of the present disclosure. Accordingly, it should be emphasized and noted that "an embodiment", "one embodiment", or "an alternative embodiment" referred to two or more times at different locations in the present disclosure do not necessarily refer to the same embodiment. In addition, certain features, structures, or characteristics in one or more embodiments of the present disclosure may be suitably combined.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A portable suitcase, comprising:

a case, wherein side walls of the case and a bottom wall of the case enclose a first accommodation space, tops of the side walls enclose a first opening, and the first opening is in communication with the first accommodation space;

a case lid, wherein one side of the case lid is rotatably connected to the top of one of the side walls of the case such that the case lid is capable of opening and closing the first opening;

a box, wherein the box comprises box side walls, and the box side walls include two opposing side walls, a top of the box forms a second opening, the box being rotatably connected to an inner side of the side walls of the case; and a cover plate, including a first side and a second side, wherein the first side is opposite to the second side, the first side is rotatably connected to the case lid, and both ends of the second side are slidably connected to tops of inner sides of the two opposing side walls, such that the cover plate is capable of opening and closing the second opening;

wherein during closing the first opening, the cover plate is moved to the top of the box to close the second opening, and the box is moved through the first opening into the first accommodation space; and during opening the first opening, the box is moved through the first opening to an outside of the first accommodation space, and the cover plate is moved to open the second opening.

2. The portable suitcase of claim 1, further comprising:

two linear slide grooves disposed oppositely, which are respectively recessed at the tops of the two opposing inner side walls of the box; and two sliders, protruding from the both ends of the second side of the cover plate, wherein the two sliders are respectively snapped into the two linear slide grooves;

wherein during opening or closing the second opening, the first side of the cover plate is rotated relative to the case lid, and the second side of the cover plate slides along an extension direction of the linear slide grooves.

3. The portable suitcase of claim 1, further comprising:

at least one limiting block, wherein when the second opening is opened, the at least one limiting block protrudes from a top of a side wall of the cover plate proximate to the box; and at least one limiting slot or limiting hole, wherein when the second opening is opened, the at least one limiting slot or limiting hole is disposed at a top of one side of the two opposing side walls away from the cover plate;

wherein when the second opening is closed, the limiting block is snapped correspondingly into the limiting slot or the limiting hole.

4. The portable suitcase of claim 1, wherein the box is located above the case when the second opening is opened;

a rotatable connection between the first side of the cover plate and the case lid is located above a rotatable connection between the case lid and the case, and the second side of the cover plate slides to one side of the two opposing side walls proximate to the case lid; and a bottom surface of the cover plate and a surface of the top of the box form an included angle.

5. The portable suitcase of claim 1, wherein the box includes:

a box bottom plate;

wherein the box side walls are vertically connected to an edge of the box bottom plate, the box side walls and the box bottom plate surround to form a second accommodation space; and at least one first partition, which is connected to the box bottom plate and/or the box side walls, such that the second accommodation space is separated into at least two subspaces.

6. The portable suitcase of claim 5, wherein a lower surface of the second side is provided with at least one block, the block being inverted U-shaped, the block being correspondingly connected to the first partition, such that the block is snapped to a top of the first partition.

7. The portable suitcase of claim 1, further comprising:

at least two linkage arms, wherein one end of each of the linkage arms is rotatably connected to the box, and the other end of each of the linkage arms is rotatably connected to the case;

when the first opening is opened, the linkage arms located on the same side of the box are parallel to each other.

8. The portable suitcase of claim 1, wherein the cover plate includes:

a flat plate;

a stiffener, disposed on at least one surface of the flat plate; and a limiting plate, which is vertically connected to a lower surface of the flat plate, the limiting plate being disposed at the edge of a side of the flat plate close to the case;

when the second opening is closed, the limiting plate is abutted against an outer wall of the box.

9. The portable suitcase of claim 1, further comprising:

a second partition, which is disposed vertically within the first accommodation space along a height direction of the case, and connected to the inner side of the side walls of the case;

wherein the box includes a first partition, and a center surface of the second partition is perpendicular to a center surface of the first partition, such that the first accommodation space is separated into an avoidance space and a storage space.

10. The portable suitcase of claim 9, wherein the box is rotatably connected to a connection between the avoidance space and the storage space, when the first opening is opened, the box is located above the avoidance space, and when the first opening is closed, the box is located inside the storage space.

11. The portable suitcase of claim 9, further comprising:

at least one third partition, which is disposed in parallel in the storage space and connected to the bottom wall of the case, such that the storage space is separated into at least two bill compartments; and at least one set of compression assemblies, which are rotatably connected to the second partition, the compression assemblies being disposed within the bill compartments for compressing bills.

12. The portable suitcase of claim 11, wherein each of the at least one set of compression assemblies includes:

a pressing arm, a head end of which is rotatably connected to the second partition, and a tail end of which is pressed against the bottom wall of the case; and a reset member, which is disposed between the pressing arm and the second partition, one end of which is connected to the pressing arm, and the other end of which is connected to the second partition.

13. The portable suitcase of claim 12, wherein the pressing arm is plate-shaped, and the tail end of the pressing arm includes a pressing portion, such that the pressing portion is capable of fitting the bottom wall of the case; or the pressing arm is tubular, and the tail end of the pressing arm is bent toward a direction away from the case to form a lifting portion.

14. The portable suitcase of claim 9, wherein the box side walls are hinged to the inner side of the side walls of the case by at least one linkage arm, the second partition being provided with an avoidance groove, so that when the at least one linkage arm pulls the box into the storage space, at least one the linkage arm is capable of passing through the avoidance groove to extend into the storage space.

15. The portable suitcase of claim 14, wherein the box has at least one groove in the box side walls, at least a portion of the linkage arm being rotatably disposed in the groove, the groove comprising a first groove and a second groove, the first groove being disposed along a height direction of the box, the second groove being connected to the bottom end of the first groove, and disposed at an angle in the direction of the avoidance space.

16. The portable suitcase of claim 14, wherein a bottom end of the at least one linkage arm forms a bent portion toward the first accommodation space of the case.

17. The portable suitcase of claim 1, wherein a front of the box side walls has an arc-shaped cross-section along an axial direction, and a concave surface of the arc-shaped cross-section is oriented toward an interior of the box.

18. The portable suitcase of claim 1, wherein the case lid is recessed toward the case to form a mounting groove, and the case lid is provided with a handle and disposed within the mounting groove.

* * * * *